(12) United States Patent
Qin et al.

(10) Patent No.: US 10,831,949 B2
(45) Date of Patent: Nov. 10, 2020

(54) NONLINEAR METHOD FOR AREA-WIDE NEAR SURFACE AIR TEMPERATURE PRECISION RETRIEVAL

(71) Applicants: Guangxi Institute of Meteorological Disaster-Reducing Research, Nanning, Guangxi (CN); Department of Guangxi Forestry Pest Management, Guangxi Forestry Bureau, Nanning, Guangxi (CN)

(72) Inventors: Jianglin Qin, Guangxi (CN); Xiuhao Yang, Guangxi (CN); Jitong Luo, Guangxi (CN); He Fu, Guangxi (CN); Xiufeng Lei, Guangxi (CN); Jun Wei, Guangxi (CN); Yuanrui Qin, Guangxi (CN); Zixin Yang, Guangxi (CN)

(73) Assignees: GUANGXI INSTITUTE OF METEOROLOGICAL DISASTER-REDUCING RESEARCH, Nanning, Guangxi (CN); DEPARTMENT OF GUANGXI FORESTRY PEST MANAGEMENT, GUANGXI FORESTRY BUREAU, Nanning, Guangxi (CN)

( * ) Notice: Subject to any disclaimer, the term of this patent is extended or adjusted under 35 U.S.C. 154(b) by 262 days.

(21) Appl. No.: 15/770,137

(22) PCT Filed: Mar. 6, 2017

(86) PCT No.: PCT/CN2017/000215
§ 371 (c)(1),
(2) Date: Apr. 20, 2018

(87) PCT Pub. No.: WO2018/145229
PCT Pub. Date: Aug. 16, 2018

(65) Prior Publication Data
US 2019/0057171 A1    Feb. 21, 2019

(30) Foreign Application Priority Data
Feb. 10, 2017    (CN) .......................... 2017 1 0073515

(51) Int. Cl.
*G06F 17/50* (2006.01)
*G01K 1/02* (2006.01)
(Continued)

(52) U.S. Cl.
CPC ............. *G06F 30/20* (2020.01); *G01K 1/024* (2013.01); *G01K 1/026* (2013.01); *G01W 1/00* (2013.01);
(Continued)

(58) Field of Classification Search
CPC ......... G01K 1/024; G01K 1/026; G01W 1/00; G06F 2111/10; G06F 30/20; G06N 20/00; G06N 20/10
(Continued)

(56) References Cited

U.S. PATENT DOCUMENTS

| 4,264,961 A * | 4/1981 | Nishimura | ............ F02D 41/187 123/494 |
| 2011/0047812 A1 * | 3/2011 | Sugimoto | ............... D06F 58/30 34/427 |
| 2014/0212061 A1 | 7/2014 | Miller | |

FOREIGN PATENT DOCUMENTS

| CN | 103258126 A | 8/2013 |
| CN | 103398780 A | 11/2013 |

(Continued)

OTHER PUBLICATIONS

Blandford, T. R. et al., "Seasonal and synoptic variations in near-surface air temperature lapse rates in a mountainous basin," J. Appl. Meteor. Climatol., vol. 47, No. 1, pp. 249-261, Jan. 2008.
(Continued)

*Primary Examiner* — John H Le
(74) *Attorney, Agent, or Firm* — Hamre, Schumann, Mueller & Larson, P.C.

(57) ABSTRACT

A novel nonlinear method for area-wide near surface air temperature precision retrieval is described. The steps
(Continued)

include: First, construct the $1^{st}$ sub-model modelVEC$^1$ to the f-th sub-model modelVEC$^f$. Establish and normalize raw data vectors of each gridded pixel sBlkVEC in the targeted area. Calculate the retrieved full maps (surfT$^f$) of near surface air temperatures using each sub-model. Then, identify abnormal samples and define their near-range regions in surfT$^f$ Apply a selective arithmetic mean (SAM) approach to achieve precision temperature map surfT. And finally apply further modification to the pixels of surfT where pixI$^f$∈badsurfT$_8^f$ is true to all f=1, 2, 3, . . . .

Using the super nonlinear algorithm, this invention provides a solution of retrieving near surface air temperature based on combinations of various factors (information fusion) to achieve satisfied prediction errors, which are independent of cloud levels and topographic characteristics. Specifically, the information fusion between space and ground surface enables reliable prediction of near surface air temperature maps overcoming the inference of cloud.

20 Claims, 10 Drawing Sheets

(51) Int. Cl.
| | | |
|---|---|---|
| *G06N 99/00* | (2019.01) | |
| *G01W 1/10* | (2006.01) | |
| *G06F 30/20* | (2020.01) | |
| *G06N 20/00* | (2019.01) | |
| *G01W 1/00* | (2006.01) | |
| *G06F 111/10* | (2020.01) | |

(52) U.S. Cl.
CPC .......... *G06N 20/00* (2019.01); *G06F 2111/10* (2020.01)

(58) Field of Classification Search
USPC ........................ 702/130, 3; 382/260; 34/427; 73/170.16
See application file for complete search history.

(56) References Cited

FOREIGN PATENT DOCUMENTS

| | | | |
|---|---|---|---|
| CN | 104181612 | A | 12/2014 |
| CN | 104657935 | A | 5/2015 |
| CN | 105844000 | A | 8/2016 |
| CN | 104657935 | B | 7/2017 |

OTHER PUBLICATIONS

Vancutsem, C. et al., "Evaluation of MODIS land surface temperature data to estimate air temperature in different ecosystems over Africa," Remote Sens. Environ., vol. 114, No. 2, pp. 449-465, Feb. 2010.
Hassaballa, A. A. et al., "The use and evaluation of split-window techniques for NOAA/AVHRR surface temperature extraction over different surface covers: case study (Perak Tengah & Manjong) area, Malaysia," IJCEE-IJENS, vol. 11, No. 5, pp. 22-27, Oct. 2011.
Qin, J. L., "Preliminary inquiry on technical support system for the precision-farming with Chinese characteristics," Transactions of the Chinese Society of Agricultural Engineering, vol. 17, No. 3, pp. 1-6, May 2001 (in Chinese with English Abstract).
Zhao, G. X. et al. "Algorithm of determining the land surface temperature and emissivity by satellite," Chinese Science Bulletin, vol. 42(18), pp. 1957-1960, Sep. 1997 (in Chinese with English abstract).
Luo, Z. Y. et al., "The application study of mono-window algorithm in Chengdu for land temperature retrieval," Journal of Tropical Meteorology, 23(4), pp. 409-412, Aug. 2007 (in Chinese with English abstract).
Li, T. H. et al., "Land Surface Temperature Calculation in Yellow River Basin by Combination of Split Window Algorithms," J. Test Meas. Technol., 22(4), pp. 338-345, 2008 (in Chinese with English Abstract).
Yang, H. et al., "A modified land surface temperature split window retrieval algorithm and its applications over China," Journal of Remote Sensing, 10(4), pp. 600-607, Jul. 2006 (in Chinese with English abstract).
Wang, C. L. et al., "All-weather applicable methodology to retrieve land surface temperature for cold disaster monitoring," Chinese Journal of Agrometeorology, 28(1), pp. 80-87, 2007 (in Chinese with English abstract).
Chen, S. H. et al., "MODIS and SPOT images fusion based on the intensity correlation moment," Journal of Remote Sensing, 10(1), pp. 90-96, Jan. 2006 (in Chinese with English abstract).
Dong, J. et al., "Retrieval of Land Surface Temperature: Theory, Deduction and Application," Journal of Gansu Sciences, 13(4), pp. 36-40, Dec. 2001 (in Chinese with English abstract).
Li, H. et al., "Study on retrieval urban land surface temperature with multi-source remote sensing data," Journal of Remote Sensing, 11(6), pp. 891-898, Nov. 2007 (in Chinese with English abstract).
Huang, H. et al., "Using Multidirectional Thermal Images to Obtain Canopy Component Temperature and Directional Brightness Temperature," Journal of Beijing Normal University (Natural Science), 2007-06,43(3), pp. 292-297, 2007 (in Chinese with English abstract).
Liu, Q. H. et al., "The retrieval of land surface temperature and emissivity by remote sensing data: Theory and digital simulation," J. Remote Sens., 2(1), pp. 1-9, Feb. 1998 (in Chinese with English abstract).
Min, W. B. et al., "An experiment on LSF conceptual model to retrieve grass canopy leaf temperature," Journal of Remote Sensing, 10(6), pp. 941-948, Nov. 2006 (in Chinese with English abstract).
Zhang, Y. S. et al., "Study on the inversion method of land surface temperature by applying IR bright temperature data of still satellite," Northwestern Seismological Journal, 26(2), pp. 113-117, Jun. 2004 (in Chinese with English abstract).
Kearns, M. et al., "Learning Boolean formulas," (1994) J.ACM 41 1298 (Abstract only).
Krogh, A. et al., "Neural network ensembles, cross validation, and active learning," In: G. Tesauro, D. S. Touretzky and T. K. Leen, eds., Advances in Neural Information Processing Systems 7, MIT Press, Cambridge, MA, pp. 231-238, 1995.
Qin, J. L. et al., "A Novel Nonlinear Algorithm for Area-wide Near Surface Air Temperature Retrieval," IEEE J. Sel. Top. Appl. Earth Obs. Remote Sens., vol. 9, No. 7, pp. 3283-3296, Jul. 2016.
Becker, F. et al., "Towards a local split window method over land surfaces," Int. J. Remote Sens., vol. 11, No. 3, pp. 369-393, Mar. 1990.
Coll, C. et al., "On the atmospheric dependence of the split-window equation for land surface temperature," Int. J. Remote Sens., vol. 15, No. 1, pp. 105-122, Jan. 1994.
Sobrino, J. A. et al., "Atmospheric correction for land surface temperature using NOAA-11 AVHRR channels 4 and 5," Remote Sens. Environ., vol. 38, No. 1, pp. 19-34, Oct. 1991.
Price, J. C., "Land surface temperature measurements from the split window channels of the NOAA 7 advanced very high resolution radiometer," J. Geophys. Res., vol. 89, No. D5, pp. 7231-7237, Aug. 1984.
Prata, A. J., "Land surface temperatures derived from the advanced very high resolution radiometer and the along-track scanning radiometer theory," J. Geophys. Res., vol. 98, No. D9, pp. 16689-16702, Sep. 1993.
Franca, G. B., "Retrieval of land and sea surface temperature using NOAA 11 AVHRR data in north-eastern Brazil," Int. J. Remote Sens., vol. 15, No. 8, pp. 1695-1712, Jan. 1994.
Kerr, Y. H. et al., "Accurate land surface temperature retrieval from AVHRR data with use of an improved split window algorithm," Remote Sens. Environ., vol. 41, Nos. 2-3, pp. 197-209, Mar. 1992.

(56) References Cited

OTHER PUBLICATIONS

Gao, B. C. et al., "Water vapor retrievals using Moderate Resolution Imaging Spectroradiometer (MODIS) near-infrared channels," J. Geophys. Res., vol. 108, No. D13, p. 4389, Jul. 2003, doi: 0.1029/2002JDO03023.

Qin, J. L. et al., "An Improved Novel Nonlinear Algorithm of Area-Wide Near-Surface Air Temperature Retrieval," IEEE Journal of Selected Topics in Applied Earth Observations and Remote Sensing, vol. 11, No. 3, pp. 830-844, Mar. 2018.

International Search Report and Written Opinion issued for International Patent Application No. PCT/CN2017/000215, dated Oct. 27, 2017, 9 pages.

First Office Action and Search Report issued for Chinese Patent Application No. 201710073515.8, dated May 3, 2018, 9 pages with English translation.

\* cited by examiner

The full scale imagery of Ta retrieved with SAM at the hour of 16:00 (Beijing time) on August 21, 2015, Guangxi province.

The illustration of delimiting method for the abnormal samples and their near-range regions. Each small square represents a pixel and "⊠" represents the pixels with unmanned weather station ($k_1$- $k_5$ in this case). Polygon ABCD defines the near-range region of $k_1$.

The prediction error analysis under different conditions. Prediction error distribution of the AM merged model (left panel) and the SAM merged model (right panel)

The flowchart of the near surface air temperature retrieving process used in the current study. Boxes with dashed-line represent the innovative steps developed by the current study.

The flowchart of the CPU + GPU application in calculation of the near surface air temperature retrieving algorithm. CPU0 initiates multiple CPUs' multiple threads to perform calculation simultaneously, followed by GPU super-core calculation. Boxes with dashed-line represent the innovative steps developed by the current study.

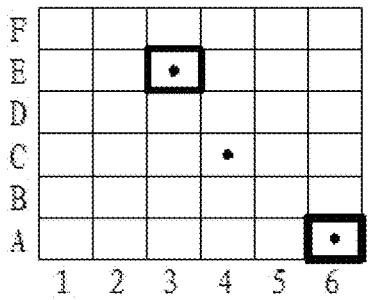

(a)

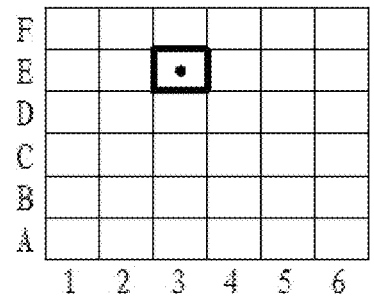

(e)

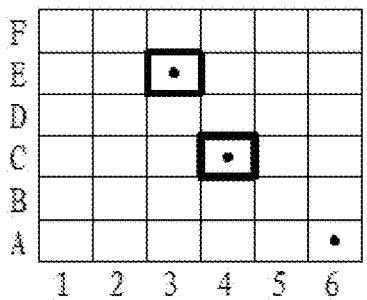

(b)

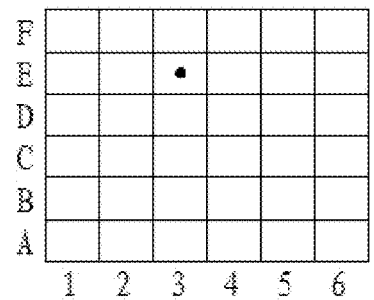

(f)

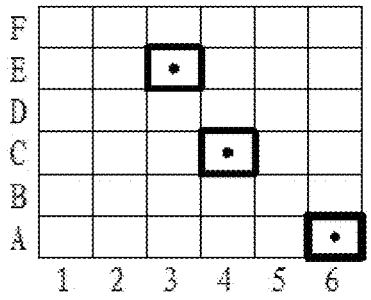

(c)

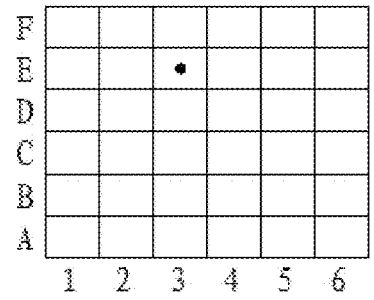

(g)

The sketch-map of SAM operation for 3 sub-models. Pixels and their near-range regions in $surfT^1$ – $surfT^3$ (a-c) and after SAM (e-g). The black dot represents unmanned weather station locations; the square represents near-range regions while the light square represents unmanned weather station with normal error and its near-range region; the dark square represents unmanned weather station with abnormal error and its near-range region. (a) $surfT^1$ abnormal error pixels ($\delta = \delta_0 = 2.0°C$) (E3 and A6) and their near-range regions. (b) $surfT^2$ abnormal error pixels when $\delta = \delta_0 = 2.0°C$ (E3 and C4) and near-range regions. (c) $surfT^3$ abnormal error pixels when $\delta = \delta_0 = 2.0°C$ (E3, C4 and A6) and near-range regions. (e) Illustration of the further operation with $\delta = \delta_1 = 3.0°C$ for $surfT^1$. Only unmanned weather station $k_{E3}$ has abnormal error. (f) Illustration of the further operation with $\delta = \delta_1 = 3.0°C$ for $surfT^2$. No unmanned weather station has abnormal error. (g) Illustration of the further operation with $\delta = \delta_1 = 3.0°C$ for $surfT^3$, no unmanned weather station has abnormal error.

Fig. 9

NONLINEAR METHOD FOR AREA-WIDE NEAR SURFACE AIR TEMPERATURE PRECISION RETRIEVAL

TECHNICAL FIELD

This invention relates to the technical field of meteorological data processing, in particular, it is a method for area-wide near surface air temperature precision retrieval.

BACKGROUND

Near surface air temperature (Ta) is commonly measured at 1.5-2.0 m above the ground in a thermometer shelter of weather stations [1-2]. It is an important parameter of energy balance on the earth's surface [3], quantitatively representing the interaction between the earth's surface and the atmospheric layer, and between soil surface and underlayers [2-3]. Moreover, Ta is closely associated with human activity [4], crop and forest growth, plant disease and insect pest outbreaks, and cold or heat stresses on crops, etc. [1-2]. Ta measurement is also critical for meteorological forecast [5] for every kinds of elements. Other weather related factors such as humidity, evaporation/transpiration amounts, drought, ground surface temperature and humidity, etc., are closely related to Ta. For these reasons Ta is useful for a wide range of applications in various disciplines including meteorology, agriculture [4], forestry, ecology, geography, and geology [1-5]. In recent years, using infrared thermography approach to research ground surface temperature has attracted great attentions. However, accurate measure of area-wide Ta remains difficult, thus limits the research and application of Ta.

Moderate-resolution imaging spectroradiometer (MODIS) and meteorological satellite (FY2/FY3) infrared (IR) imagery data can be used to obtain temperature information over a large area. These resources provide a good data support for Ta remote sensing. The main challenge is that temperatures retrieved from satellite data can deviate from reality due to various inevitable influential factors of surface radiation and atmosphere. Brightness temperature represented by satellite IR bands may not be a true representation of temperatures, and such discrepancies cause uncertainty. How to overcome the complexity of land surface characteristics and atmosphere variability in temperature retrieving over a large area remains a difficult task.

Temperature retrieving techniques traditionally are developed for land surface temperature (LST or Ts). The current invention uses readily available temperature information to address the need of near surface temperature. Although the concepts of retrieving land surface temperature and near surface temperature are different, the methods can be common.

Luo et al [6] proposed a generalized single-window algorithm. Li et al. [23] compared seven commonly used split-window algorithms under different water contents and land covers to identify the best algorithm for different conditions. The study treated the entire target area as a whole, and applied divisions based on water content and ground vegetation coverage. Yang et al [8] applied Becker's split window to estimate LST. However, all those algorithms basically are linear models with limited number of variables without considering ground vegetation and topographical characters. In addition, errors of these models are accumulative and unpredictable. Wang et al [9] applied the concept of climatological model and GIS technology for retrieving LSTs of clear and cloudy days involving separate models, but only partially overcome the effect of cloudy. Chen et al. [10] developed a fusion algorithm for temperature imagery of different spatial resolutions, but had no solution for imagery fusion of different temporal resolutions. Many developed models [8, 10-17] are not robust enough and only deliver acceptable temperature estimations under specific conditions. For example, Liu et al [14] developed an algorithm that requires water vapor profile error within ±20% to achieve the root mean square error (RMSE) of 0.85° C. Other algorithms only produce acceptable results on clear days. These limitations impose a great difficulty in developing temperature remote sensing products. Specifically, in Southern China, cloudy days are regular occurrence, and the area has complex topography and underlying surface characteristics. It is extremely difficult to retrieve Ta with acceptable errors and develop products for large areas because all currently available methods produce expected results only under specific conditions, and require corrections of certain variables, e.g. atmospheric water vapor profile, to avoid large errors. Furthermore, errors of these models are intrinsically accumulative and unpredictable. These algorithms include very limited number of variables and unable to consider the effect of important temperature influential variables such as ground vegetation and topographical characters, etc. More importantly, model generalization ability was rarely discussed.

This invention employs support vector machines (SVM) for its minimum structure risk principle. SVM minimizes sample errors, and simultaneously reduces the upper-bound generalization error to improve generalization ability. Kearns and Valiant [18] proved that a weak learning algorithm can be integrated to produce highly accurate estimations if there are sufficient samples, i.e., a weak learning is equivalent to a strong learning. The effectiveness of an integrated learning depends on the accuracy of sub-learnings and the variability between sub-learnings. The higher accuracy of a sub-learning and lower variability among the sub-learnings, the higher accuracy and stronger generalization ability of the integrated learning will be. Krogh and Vedelsby [19] provided the computational formula of generalization error.

High performance desktop computer and parallel computing technique with ultra-number cores has made enormous progress in recent years. Its application has made breakthroughs in many fields. The latest Fermi architecture, which is the newest generation of products of CUDA (Compute Unified Device Architecture) based architecture, is rated as the topmost among the same kind of devices because it is relatively inexpensive and small in size with high running speed and low energy consumption. Its CPU+GPU (Graphics Processing Unit) architecture with separate CPU's management function and GPU's computing function especially suits for image processing as one can assign one core of GPU to be responsible for computing one or several pixels and simplify parallel computing procedure. With Fermi architecture, we can organize thousands of cores and threads to form a supercomputer for temperature retrieval algorithm, and accomplish the requirement of real time retrieval over large areas. A CPU+C2075 system is used for calculation of an area-wide temperature retrieval algorithm of this invention, which is a key technology for the application.

We previously achieved a breakthrough in near surface air temperature retrieval based on applications of GIS and non-linear mathematics using the CPU+GPU super computation technology [20] (Patent #ZL201510103565.7). The modeling and validation exercise with over 530,000 data vectors under different weather conditions of different seasons showed that the model is advanced with high accuracy (at least 60% improvement over other techniques), reliability and generalization ability, and high tolerance to interference of cloud, ground vegetation (from none to heavy) and atmospheric water vapor content. These superb properties make the model very much suitable for all-time area-wide retrieving under natural conditions. The results represent a significant improvement compared to the internationally recognized 7 temperature retrieving algorithms[21-27][Li[7] et al 2008, and Becke[21] et al 1990, Coil[22] et al 1994, Sobrinot[23] et al 1991, Price[24] 1984, Prata[25] 1993, Franca[26] and Cracknell 1994, Kerr[27] et al 1992]. The use of CPU+GPU super computer increases calculating speed by 1000×, with easily expendable capabilities. The modeling technology is unanimously approved by international experts and represents a significant advancement. However, the patented modeling technology[20] (Patent #ZL201510103565.7) still has shortcomings of uneven error distribution among sub-models, and unexplainable and irregular errors for certain pixels. The current patent focuses on fixing these issues of the SVM model by identifying and removing problematic predictions and replacing them with new predicted values of another sub-model. The sub-model merging approach is upgraded from the simple arithmetic mean method (AM) to a selective arithmetic mean method (SAM) that retains reasonable errors and eliminates unreasonable errors. This practice offers significant improvement in predicting accuracy and reliability with better error evaluations.

In recent years, the number of weather stations in Guangxi province has increased from 92 with manual recording at every 8 hours to 1,400 with automatically hourly recording. Unmanned weather station network establishments across China are close to completion. However, unmanned weather stations are mainly distributed in plat areas and cannot represent differences resulted from complex topographical characteristics. In the past several years, the Chinese FY2/FY3 satellite serial and MODIS technology improved greatly. The FY2E/C&FY2D/FY3 double geostationary satellites provide hourly monitoring. MODIS on satellites capture data in 36 spectral bands with 250×250 m resolution. A digital elevation model (DEM) provides 3D representation of the terrain's surface of Earth with a spatial resolution as high as 100×100 m. Although the IR data collected by MODIS and FY2/FY3 satellites can be used for Ta retrieving, overcoming the interference of cloud still is an issue, making all-time monitoring not feasible. Compared to the data collection capability, a lack of data application and analysis software technology is apparent. A key urgent challenge is how to utilize the massive data collected by the unmanned weather stations and satellites in which huge resources have already invested to provide high quality (high accuracy, resolution and reliability) real-time weather data services.

SUMMARY OF THE INVENTION

To overcome the short comes of the current technology, this invention is a method for area-wide near surface air temperature precision retrieval that utilizes multiple remote sensing imageries, topography DEM and unmanned weather station data in cloudy areas.

The invention has the following technical steps:
Step I: establishing raw datasets and normalizing—AutoVEC';

Step II: establishing the $1^{st}$ training dataset (supVEC$^1$) and the $1^{st}$ validation dataset (exVEC$^1$);
Step III: obtaining the $1^{st}$ sub-model (modelVEC$^1$);
Step IV: obtaining the $2^{nd}$ sub-model (modelVEC$^2$);
Step V: obtaining the $3^{rd}$ sub-model (modelVEC$^3$) to the $f^{th}$ sub-model (modelVEC$^f$), include:

(1) using the normalized data of AutoVEC' and the $(f-1)^{th}$ sub-model model VEC$^{f-1}$ to calculate the predicted temperatures of AutoVEC' as:

$$AutopixIT_j^{f-1} = \sum_{i=1}^{supNum^{f-1}} \alpha_i^{f-1} \times \exp\{-\gamma^{f-1} \times \| modelVEC^{f-1} - AutoVEC\|^{f-1}\} - b^{f-1}$$

Where $j = 1, 2, \ldots, L$; $f \geq 3$, and $f \in Z^+$;

(2) calculating the absolute errors ($AE_j^{f-1}$) between the predicted temperatures of the $(f-1)^{th}$ sub-model (AutopixIT$_j^{f-1}$) and actual measured temperature (MT$_j$);

(3) calculating the estimated absolute error ($AE_j^f$) of the predicted temperature of $f^{th}$ sub-model at $j^{th}$ sample point, so that, $$AE_j^f = Min(AE_j^1, \ldots, AE_j^{f-2}, AE_j^{f-1});$$

(4) ranking the data vectors of AutoVEC' based on the estimated absolute error value of the predicted error ($AE_j^f$) from high to low;

(5) selecting supNum$^f$ data vectors with the higher estimated absolute errors ($AE_j^f$) as the $f^{th}$ sub-model training dataset supVEC$^f$, and the rest as the $f^{th}$ validation set exVEC$^f$; and (6) following Step III to obtain modelVEC$^f$;

Step VI: establishing raw dataset for the raster pixel of sBlkVEC and normalized set sBlkVEC';

Step VII: near surface air temperature (Ta) retrieving of sub-models, include:

(1) inputting vector sBlkVEC' to sub modelVEC$^1$ through modelVEC$^f$, respectively, to calculate the predicted temperature of the $1^{st}$ sub-model as GridpixIT$_q^1$ to the $f^{th}$ sub-model of GridpixIT$_q^f$ of each pixel as:

$$GridpixIT_q^f = \sum_{i=1}^{supNum^f} \alpha_i^f \times \exp\{-\gamma^f \times \| modelVEC^f - sBlkVEC'\|^2\} - b^f$$

Here, $q = 1, 2, \ldots, sBlkSamples$, $f = 1, 2, 3, \ldots$ sub-models;

(2) the calculated Ta of the $1^{st}$ sub-model GridpixIT$_q^1$ is the retrieving image of that sBlk.

Follow the same scheme to obtain the $2^{nd}$ to the $f^{th}$ sub-model retrieving image of that sBlk.

(3) selecting another sBlk and repeat above 1) and 2) to complete all sBlk within all BlkNum;

(4) combining all BlkNum sBlks of the $1^{st}$ sub-model to form retrieving image of the target area surfT$^1$.

Follow the same steps to obtain the $2^{nd}$ to $f^{th}$ sub-model retrieving image surfT$^2$ to surfT$^f$.

Step VIII: marking abnormal samples and their near-range regions in surfT$^f$, include:

(1) in surfT$^1$, read pixIT$_k^1$ which is the calculated temperature at $k^{th}$ unmanned weather station with $1^{st}$ sub-model, where k=1, 2, . . . K$_t$. K represents number of the unmanned weather stations with actual Ta measurement (MT$_k$) at target temporal point;

(2) establishing $RealAE_k^1$ $$RealAE_k^1 = |pixlT_k^1 - MT_k|$$

If $RealAE_k^1 \geq \delta$ (a set error threshold), the $k^{th}$ pixel is classified as abnormal;

(3) defining the near-range region of the abnormal samples, wherein, the near-range region of the $k^{th}$ abnormal samples is defined as the polygon (at least a triangle) formed by σ multiplies the distance between the $k^{th}$ unmanned weather station and the adjacent unmanned weather stations at all directions (at least three directions). The value σ is set according to need (normally at 0.75~1.0). If there is no unmanned weather station in one direction, the boundary of the research region should be the boundary of the target area;

(4) for a given δ, if raster pixel where the $k^{th}$ weather stations is located in is abnormal, its near-range region is expressed as $badPolygon_{\delta k}^1$;

(5) recording $$badPolygon_\delta^1 = \bigcup_{k=1}^{K_i} badPolygon_{\delta k}^1;$$

(6) repeating Steps (1) to (5) to establish $badPolygon_\delta^f$, and (7) recording $$mostbadPolygon_\delta = \bigcap_{f=1}^{f} badPolygon_\delta^f;$$

Step IX: selective arithmetic mean method (SAM) to obtain accurate surfT, for threshold $\delta = \delta_0$ ($0 < \delta_0$), (1) recording $badsurfT_\delta^f$ as the region of extracting (surfT$^f$) by mask ($badPolygon_\delta^f$);

(2) defining the weights in SAM of pixl$^f$ in surfT$^f$ as $surfParameter_\delta^f$, If $pixl^f \in badsurfT_\delta^f$, $surfParameter_\delta^f = 0$, If $pixl^f \notin badsurfT_\delta^f$, $surfParameter_\delta^f = 1$, and If $pixl^f \in badsurfT_\delta^f$ is true for all f=1, 2, 3, . . . , i.e. $pixl^f \in mostbadPolygon_\delta$, then $surfParameter_\delta^f = 1$; and (3) the preliminary formula of SAM Ta retrieving is as:

$$surfT = \frac{\sum_{f=1}^{f}(surfParameter_\delta^f \times surfT^f)}{\sum_{f=1}^{f} surfParameter_\delta^f}$$

where f=1, 2, 3, . . . ; and

Step X: for the region that $pixl^f \in badsurfT_\delta^f$ within surfT$^f$ is true for all f=1, 2, 3, . . . ; a further operation is required, wherein (1) if $mostbadPolygon_\delta$ is empty, the result of Step IX is final and we achieve more accurate surfT, (2) if $mostbadPolygon_\delta$ is not empty, separate the $mostbadPolygon_\delta$ from the target area. Set $\delta = \delta_1$, repeat Steps VIII and IX until $mostbadPolygon_\delta$ is empty or $\delta = \delta_s$, where multiple δ values are set as $0 < \delta_0 < \delta_1 < \delta_2 < \ldots \delta_t \ldots$ $< \delta_s$. The obtained more accurate surfT of $mostbadPolygon_{\delta i}$ is used to replace what used in Step IX to achieve more accurate surfT:

The abnormal sample threshold $\delta = 2-3°$ C.

Near-range region multiplier σ=0.75-1.0

Step I: establishing raw datasets and normalizing—AutoVEC' as following:

(1) set a target area and locates all unmanned weather stations in that area.

(2) set a target temporal point (a date and a time point) and set a collection window of 2-72 hours around the set target time point. The actual time of measurement taking by the weather stations within this window is entered as the collecting time.

(3) the raw data were recorded in the format: <$MT_j$, $F_j^1$, $F_j^2$, . . . m $F_j^i$, Label>, j=1, 2, . . . , L; i=1, 2, . . . , N; $MT_j$ represents the actual Ta measurement of $j^{th}$ raw data record, $F_j^i$ represents the measurement of $i^{th}$ influential variable at the $j^{th}$ raw data record; N is the number of predetermined variables; L is the number of raw data records. Finally, Label records the numerical identifier of that weather station and the actual observation date and time point. Only complete data vectors were included.

Each data vector $F_j^i$ consists of air temperature measurement of that weather station ($MT_j$) at a set time point and the corresponding (temporal and spatial) measurement of $i^{th}$ variable from satellites, DEM, and astronomical and calendric rules.

(4) selecting another weather station or different time point of the same station and repeat 3) to get all data vector.

(5) recording raw data vectors which obtained from step (2) and (3) as AutoVEC (6) For the same target area, select another time point, repeat (2)-(4), and record in AutoVEC (7) standardizing the raw values of each variable $F_j^i$ which is the influential factor of near surface air temperature in the raw data records AutoVEC to get AutoVEC'. The raw data records are obtained from the location of the weather stations Step II: constructing the $1^{st}$ training dataset (supVEC$^1$) and the $1^{st}$ validation dataset (exVEC$^1$) as the following:

(1) ranking the data vectors within AutoVEC' according to $MT_j$. The $1^{st}$ leaning dataset, supVEC$^1$, consists of data vectors of the first c and the last d vectors in the ranking.

(2) standardized vectors ranked the first 3-5% and the last 3-5% are assigned as supVEC$^1$ and $1^{st}$ validation dataset, exVEC$^1$, respectively.

(3) randomly selecting 10-12% of the rest data vectors into supVEC$^1$, and the rests are included in exVEC$^1$.

Step III: constructing the $1^{st}$ sub-model (modelVEC$^1$) as the followings:

applying support vector machine (SVM) Gaussian kernel function with the values (γ) of e parameters set based on experience to the data vectors in the $1^{st}$ training dataset (supVEC$^1$) to obtain e candidate models. Calculate the predicted temperatures ($FT_j$) of these candidate models and the prediction errors using the data entries in exVEC$^1$ and compared with the actual measured value, $MT_j$. The model with the lowest error is designated as modelVEC$^1$.

Step IV: constructing the $2^{nd}$ sub-model (modelVEC$^2$), include:

(1) using the standardized dataset AutoVEC', and the first sub-model, modelVEC$^1$ to calculate the predicted temperatures (AutopixlT$_j^1$) of AutoVEC' as:

$$AutopixIT_j^1 = \sum_{i=1}^{supNum^1} \alpha_i^1 \times \exp\{-\gamma^1 \times \| modelVEC^1 - AutoVec^i \|^2\} - b^1$$

$$j = 1, 2, \ldots, L;$$

(2) calculating the absolute errors ($AE_j^1$) of $1^{st}$ sub-model between the predicted temperatures ($AutopixIT_j^1$) and $MT_j$, then rank the data vectors of AutoVEC' based on the absolute error value of the predicted error from high to low;

(3) selecting the first $supNum^2$ data vectors with the highest absolute errors ($AE_j^1$) as the $2^{nd}$ training dataset $supVEC^2$, and the rest as the $2^{nd}$ validation set $exVEC^2$, and (4) repeating Step III to construct the $2^{nd}$ sub-model $modelVEC^2$; and Step VI: establishing raw dataset for the raster pixel of sBlkVEC and normalized set sBlkVEC' as the following:

For a given time point within the time window for data collection time window of the targeted time point, (1) dividing a targeted area into BlkNum square subset areas (sBlk). Each sBlk is further divided into M×M=sBlkSamples pixels. M represents the number of rows and columns within a sBlk, (2) for every pixel of sBlk, construct raw data vectors sBlkVEC in the format of <$GridpixIT_q^f$, $G^1_q$, $G^2_q$, ... $G^i_q$, Label>, q=1, 2, . . . , sBlkSamples, i=1, 2, . . . , N; $GridpixIT_q^f$ is the calculated Ta of the q-th pixel of modelVEC$^i$; $G^i_q$ is the i-th influential variables. The values of $G^i_q$ are based on weather satellites, DEM, and astronomical and calendric rules. Label can be default (space only); and (3) normalizing data vectors sBlkVEC, and get standardized sBlkVEC'.

Furthermore, this method for area-wide near surface air temperature precision retrieval, wherein (1) the Ta influential variables of MODIS include:
1C, 2C, 7C, 3C and 4C represent vegetation chlorophyll absorption, cloud/canopy boundary, ground/cloud properties and soil/canopy difference, green vegetation, respectively, at the unmanned weather station or pixel locations;
2C and 19C represent cloud/canopy boundary and cloud/atmosphere properties, respectively at the unmanned weather station or pixel locations;
27C and 28C represent cirrus clouds/water vapor at the unmanned weather station or pixel locations;
22C, 23C, and 31C represent cloud/ground temperature, and 32C represent cloud height/ground temperature at the unmanned weather station or pixel locations;

(2) the Ta influential variables of FY2 satellite include:
FY2C_IR1, FY2C_IR2, FY2C_IR3 and FY2C_IR4 represent brightness temperature; and FY2C_VIS represents reflectivity at the unmanned weather station or pixel locations;

(3) the Ta influential variables of DEM include geolocation coordinates, altitude, slope steepness, aspect, sun shadow, solar elevation, solar elevation sin, horizontal solar orientation, slope solar elevation, slope solar elevation sin, hourly slope solar radiation (per unit area), and pre-accumulative solar radiation energy at the unmanned weather station or pixel locations;

(4) the Ta influential variables of calendar rules include accumulative solar radiation energy (per unit area per day), sunrise, sunset, and day time length at the unmanned weather station or pixel locations.

Furthermore, this method for area-wide near surface air temperature precision retrieval has the characteristic of treating driving variables and influential variables separately under the concept of ideal conditions. The driving variable is defined as the driver of near surface air temperature. During the day, it is the ground radiation energy per unit area assuming atmosphere absence. During night time, it represents the dynamics of ground radiation energy. The influential variables refer to resent remote sensing data of ground cover conditions under clear sky and the effects of topographical shadows. Specifically, atmospheric corridor water vapor content is considered as well. The contributions of these variable's to near surface air temperature are optimized by nonlinear algorithms. These influential variables can limit the change of near surface air temperature.

Furthermore, this method for area-wide near surface air temperature precision retrieval uses raw data normalization as the following:

For the $i^{th}$ influential variable in AutoVEC, obtain the maximum $[F(i)_{max}]$ and minimum $[F(i)_{min}]$ values. Using the following formula to calculate the standardized values of each data vectors of AutoVEC ($F^i_j$) to arrive AutoVEC'

$$X_j^i = \frac{F_j^i - F(i)_{min}}{F(i)_{max} - F(i)_{min}}$$

where $X_j^i$ are components of $AutoVec'$.

Furthermore, this method for area-wide near surface air temperature precision retrieval uses parameters c and d mentioned in 1) of Step II as c=3-20 and d=3-20.

Furthermore, this method for area-wide near surface air temperature precision retrieval has the number of sub-models e in Step III of e=3-10.

Furthermore, this method for area-wide near surface air temperature precision retrieval has the f-th sub-model modelVEC$^f$ that contains the following parameters: number of support vector supNum$^f$, $\alpha_i^f$, $\gamma^f$ and $b^f$, where f=1, 2, 3, . . . .

Furthermore, this method for area-wide near surface air temperature precision retrieval has Step V accomplished on a super-computer platform. The CPU+GPU (Graphics Processing Unit) architecture uses multiple CPU threads to construct raw data records of gridded pixels (sBLKVEC) and sBLKVEC normalization, to manage data exchange between RAMs and hard drives, and between RAMs of CPU and GPU. The amount of data for each exchange depends on the RAM size of GPU. GPU is responsible for calculating the Ta of each pixel based on the $1^{st}$ sub-model $GridpixIT_q^1$ to the f-th sub-model $GridpixIT_q^f$.

The mentioned chlorophyll absorption 1C is data from MODIS satellite Channel 1; the mentioned cloud/canopy boundary 2C is data from MODIS satellite Channel 2; the mentioned ground/cloud properties 7C is data from MODIS satellite Channel 7; the mentioned soil/canopy difference 3C is data from MODIS satellite Channel 3; the mentioned green vegetation 4C is data from MODIS satellite Channel 4; the mentioned cloud/atmosphere properties 19C is data from MODIS satellite Channel 19; the mentioned cirrus clouds/water vapor 27C is data from MODIS satellite Channel 27; the mentioned cirrus clouds/water vapor 28C is data from MODIS satellite Channel 28; the mentioned cloud/ground temperature 22C is data from MODIS satellite Channel 22; the mentioned cloud/ground temperature 23C is data from MODIS satellite Channel 23; the mentioned cloud/ground temperature 31C is data from MODIS satellite Channel 31; the mentioned cloud height/ground temperature 32C is data from MODIS satellite Channel 32. Additionally, atmosphere water content is a calculated value based on data of MODIS Channel 2 and 19 using the Kaufman & Gao formula.

The mentioned solar elevation sin is solar elevation multiplies the sin of solar elevation angle.

The mentioned slope solar elevation sin is slope solar elevation multiplies the sin of slope solar elevation angle.

The mentioned slope solar radiation is the day accumulative solar radiation energy per unit area.

The mentioned pre-accumulative solar radiation energy is the sum of solar radiation per unit area before the sampling time The mentioned hourly slope solar radiation energy is the solar radiation per unit area at the sampling time For the mentioned normalization of influential factor in the raw datasets AutoVEC of unmanned weather stations of Step I (5) and sBlkVEC of Step V (3), air temperature $MT_i$ are the original readings since air temperature is not an influential factor and no need to standardize.

ACKNOWLEDGEMENT

This invention was supported financially by Guangxi Key Science and Technology Project (GuiKeGong 1355010-5), Guangxi Forestry Pest Management Project 'Key Technology and Application of Forestry Pest Monitoring and Warning Systems' (GuiKeJianZi 2014 #323), and Research Programs of Guangxi Meteorology Bureau (GuiQiKe 2016M21).

Compared to the existing technology, the current invention has the benefits of:

This invention employs super non-linear algorithms to resolve issues of current technology in information fusion for near surface air temperature retrieval. The outcome errors are independent of cloud and topographical characteristics. Specifically, the retrieval model combines ground and space information to obtain an accurate near surface air temperature image that overcomes the interference of cloud. The retrieving technology docked with GIS realizes combined application of multi-types of information to improve retrieving accuracy and robustness of area-wide application. Compared to our previous patent of the same technology, the current patent represents a great improvement.

In our experiment, we found 25% of samples with prediction error >1° C. had higher variability. Based on the SVM theory, Kearns and Vzliant's sub-learning and integrated learning theory [18], and Krogh and Vedelsby's integrated learning and error generalization theory [19], we applied a proper design of sample classification to construct training dataset to increase the accuracy of integrated learning and generalization capability. The construction of multiple sub-models and selective arithmetic mean approach further improved retrieving accuracy and generalization. Our experimental results indicate that our models combined with GIS spatial analysis technology maximize the utilization of spatial, ground and near ground temperature information, and reduce the interference of cloud, topography, atmosphere and atmosphere vertical structure to near surface air temperature retrieval.

It is rare that CPU+GPU configuration is used in near surface air temperature retrieval. Currently, this application is the most cost effective super computation tool. The current patent describes a smart allocation of CPU and GPU, i.e. the multi-threads of CPU are responsible for data collection and normalization, data exchange between computer RAM and hard driver, and data exchange between computer and GPU RAMs; GPU is responsible for the massive core computations. The amount of each data exchange is adjusted by the RAM size of GPU to achieve high computing speed, which is more than 1000× faster than the traditional single CPU application.

This patent enables real time near surface temperature retrieval with high spatial and time resolutions. This temperature product supports more accurate risk assessment of crop freezing damage, chills, high temperature stress, and forest pests. Based on the near surface temperature, we can easily obtain evapotranspiration and humidity to adjust crop irrigation. It also provides support for detailed classifications in climate, agriculture, forestry and forestry pests; for streamlining weather forecast; and for projects of digital and intelligent Earth, digital city and digital forestry.

This patent has novelty for temperature retrieval models. Traditional temperature models focused on land surface temperature and can be two types: experimental and theoretical. Experimental methods are correlation models based on real measurement data and satellite data. Theoretical methods involve solving equations of radiation transmission, such as split-window methods. This patent focuses on using available temperature data to meet the demand of near surface air temperature. The concepts are different between land surface temperature and near surface air temperature, but the methods are similar and exchangeable.

The novelty of this patent is to treat temperature drivers and influential variables separately and introduce variables under optimal conditions. For example, using ground vegetation image of clear day to represent vegetation condition at near time point; using solar radiation energy assuming no atmosphere or ground surface radiation dynamics during night time to construct temperature drivers; considering effect of topographical shadow; using satellite images of critical time; and calculating water content of atmosphere. The contributions of these variables to near surface air temperature are optimized by non-linear models to correct various interferences. There are less accumulation errors as there are no intermedia calculation steps. This patent also uses several sub-models with large differences to formulate new model to reduce errors and improve generalization capability. The case study #1 of area-wide retrieval achieved mean absolute error (MAE) of 0.75-0.79° C. and RMSEs of 0.60-0.86° C.

Additionally, this patent has the following advantages to Patent #ZL201510103565 [20]:
1. Higher accuracy, reliability and generalization capability. The generalization was not addressed by traditional methods
2. Overcome the interference of cloud, topography, ground vegetation coverage, reflected by the resulted images and error analysis.
3. Application of CPU+GPU architecture to satisfy the high computation demand of the non-linear algorithm for area-wide retrieval and to increase calculation speed by >1000×. The computation capacity can be easily increased by GPU expansion.

The novelty of this patent is represented by adjustment of sub-model merging based on the following principles:
(1) While tuning every sub-model to ensure higher generalization, the MAE and RMSEs need to be similar between modeling and validation datasets.
(2) The best merged model is obtained when $\delta_0$ approaches to the critical value.

The critical value of $\delta_0$ is defined as ~75% of pixels have AE≤δ for every sub-model. The best merged model is obtained when $\delta_0$ approaches to the critical value. The case study has $\delta_0$=2.0. Shown in Table 3 and 4, as $\delta_0$ changed from much greater than 2.0 to close to 2.0, the errors were minimized to reasonably the lowest level.

(3) The merge of sub-models with greater differences creates the best improvement (4) The installment of multiple $\delta$ as $0<\delta_0<\delta_1<\delta_2< \ldots \delta_i \ldots <\delta_s$ can rapidly reduce MAE where pixels with AE$\geq\delta_0$ of the different sub-models concentrate. A deep gap of AE appears near $\delta_i$. However, the required RAM space for computation will multiply.

BRIEF DESCRIPTION OF THE DRAWINGS

FIG. 9 is the sketch-map of SAM operation for 3 sub-models. Pixels and their near-range regions in surfT$^1$-surfT$^3$ (a-c) and after SAM (e-g). The black dot represents unmanned weather station locations; the square represents near-range regions while the light square represents unmanned weather station with normal error and its near-range region; the dark square represents unmanned weather station with abnormal error and its near-range region.

DETAILED DESCRIPTION

Case Studies Using the Patented Technology

Case Study #1

Figure 1:
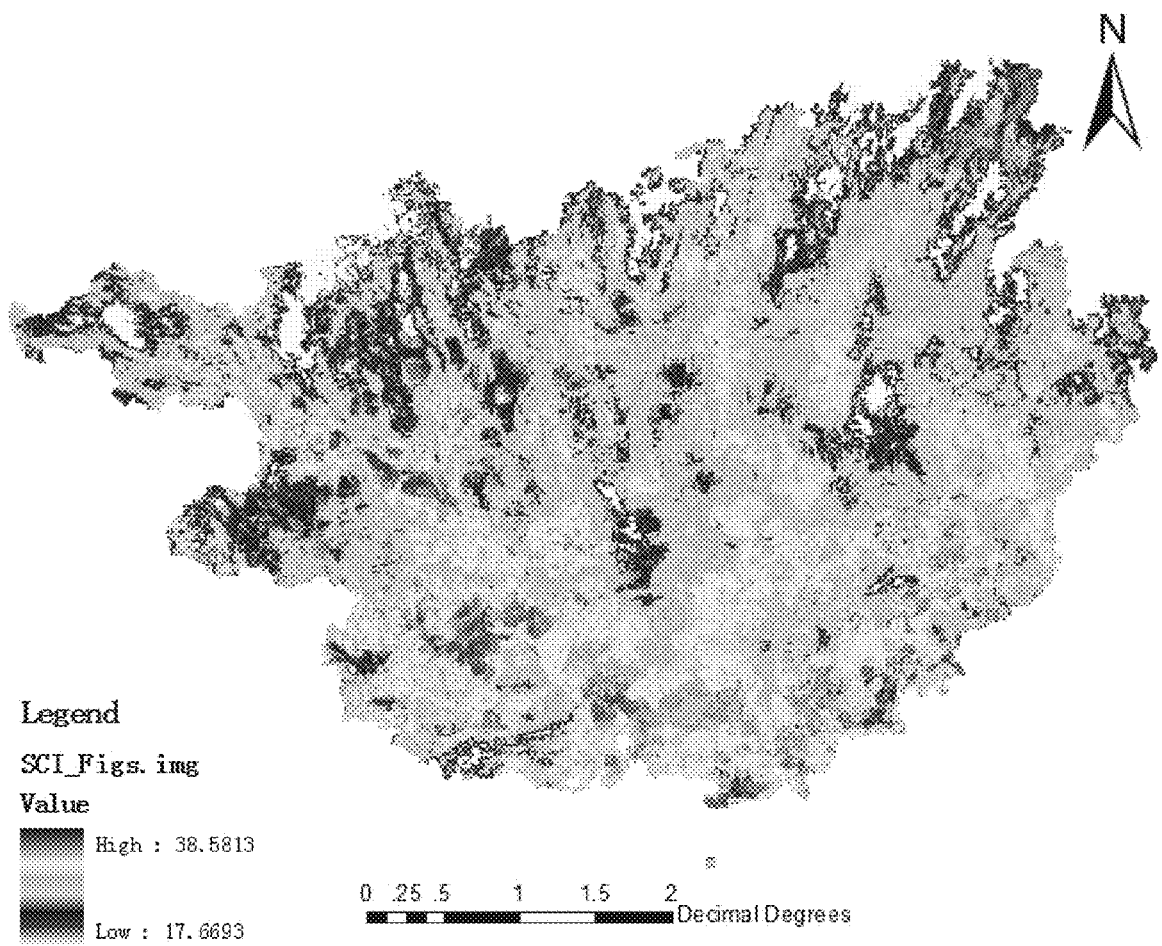
FIG. 1 is a schematic diagram illustrating a full scale imagery of retrieved near surface air temperature (Full surfT) at the hour of 16:00 (Beijing time) on Aug. 21, 2015, Guangxi province (Case Study #1). Spatial resolution 90×90 m.

A method for area-wide near surface air temperature precision retrieval includes the following steps:

Step I. constructing raw data records and normalization, include:

(1) set the target area and time. Locate the unmanned weather station locations. Set the temporal data collection window of 2-72 hours around the set time. Record temporal data according to the unmanned weather station recording time within the collection window.

In this case study, the entire Guangxi province of China (between latitude 20°54'-26°24' N and longitude 104° 26-112° 04' E with an area of 236,670 km$^2$) was the targeted study area with 1359 unmanned weather stations. The uploaded temperature readings of these weather stations were collected and carefully examined and verified by the basic weather stations. The targeted single temporal point was Aug. 21, 2015 at 16:00 hour (Beijing time). MODIS and FY2C/D hourly data between 00 hour of Aug. 21 and 23 hour of Aug. 31, 2015 were collected (Table 1). MODIS data represents atmosphere and cloud conditions and would be similar within a few hours around the target temporal point or within a few days. The size of the collection window depends on the stability of atmosphere and cloud conditions. Wider temporal window can be used in winter than in summer. Nine MODIS images were collected. Data of MOSIS channels of 1, 2, 7, 3 and 4 at 06 hour of Jan. 15, 2018 (UT) (a clear day) represented ground vegetation coverage of the targeted temporal point (16:00 hour, Aug. 21, 2015) as ground vegetation coverage is relative stable around the target temporal point.

TABLE 1

The MODIS imagines used in the case study

| Stalling temporal point (UT) | Ending temporal point (UT) | MODIS imagine file |
| --- | --- | --- |
| 08/20/2015 16:00:00 PM | 08/21/2015 15:00:00 PM | terra_2015_08_21_03_18_sy.MOD0250M_PRJ.tif |
| 08/21/2015 16:00:00 PM | 08/22/2015 15:00:00 PM | TERRA_2015_08_22_03_59_GZ.MOD0250M_PRJ.tif |
| 08/22/2015 16:00:00 PM | 08/23/2015 15:00:00 PM | terra_2015_08_23_03_05_sy.MOD0250M_PRJ.tif |
| 08/24/2015 16:00:00 PM | 08/25/2015 15:00:00 PM | terra_2015_08_25_02_53_sy.MOD021KM_PRJ.tif |
| 08/25/2015 16:00:00 PM | 08/27/2015 15:00:00 PM | aqua_2015_08_27_05_46_sy.MOD021KM_PRJ.tif |
| 08/27/2015 16:00:00 PM | 08/28/2015 15:00:00 PM | TERRA_2015_08_28_03_22_GZ.MOD021KM_PRJ.tif |
| 08/28/2015 16:00:00 PM | 08/30/2015 15:00:00 PM | terra_2015_08_30_03_11_sy.MOD021KM_PRJ.tif |
| 08/30/2015 16:00:00 PM | 09/01/2015 05:00:00 AM | TERRA_2015_09_01_02_57_GZ.MOD021KM_PRJ.tif |
| 09/01/2015 06:00:00 AM | 09/01/2015 08:00:00 AM | aqua_2015_09_01_06_04_sy.MOD021KM_PRJ.tif |

(2) set the temporal point at 16 hour (Beijing time), Aug. 21, 2015.

(3) the example of establish the 1st raw data record

Unmanned weather station #59041 (located at Liaocheng); the near surface air temperature reading at 14 hour, Aug. 22, 2015 was designated as MT$_1$=34.0° C.

At this location, the MODIS 1C=94.0, 2C=251.0, 7C=87.0, 3C=115.0, 4C=99.0, 2C=196.0 (of the corresponding pixel), 19C=128.0, atmosphere water vapor=0.45496, 27C=2719.0, 28C=2.0, 22C=3051.0, 23C=3030.0, 31C=2936.0, 32C=2699.0.

The FY2C/D data were FY2C_IR1=0.000135, FY2C_IR2=0.305916, FY2C_IR3=0.248436, FY2C_IR4=0.296953, and FY2C_VIS=0.298367.

From DEM, the coordinates of #59041 station are N 109.25 and E 24.65, altitude=136.0, slope steepness=12.19449, aspect=357.13576, sun shadow=222.0, solar elevation=67.931, solar elevation sin=0.92673, horizontal solar orientation=236.1212, slope solar elevation=59.87402, slope solar elevation sin=0.864924, hourly slope solar radiation (per unit area)=4.15, pre-accumulative solar radiation energy=23.65.

From astronomical and calendric rules, accumulative solar radiation energy (per unit area per day)=24.13, sunset=19.11 (Beijing time), sunrise=6.41 (Beijing time), and day time length=12.70.

Thus this data vector was written as <34.0, 109.25, 24.65, 136.0, 12.19449, 357.1376, 94.0, 251.0, 87.0, 115.0, 99.0, 196.0, 128.0, 0.45496, 2719.0, 2.0, 3051.0, 3030.0, 2936.0, 2699.0, 0.000135, 0.305916, 0.248436, 0.296953, 0.298367, 222.0, 67.931, 0.92673, 236.1212, 59.87402, 0.864924, 4.15, 23.65, 24.13, 19.11, 6.41, 12.70, B59041D2015082214>.

The sequence of influential variables in the vector is weather station measurement, latitude, longitude, altitude, 1C, 2C, 7C, 3C, 4C, 2C, 19C, atmosphere water vapor, 27C, 28C, 22C, 23C, 31C, 32C, FY2C_IR1, FY2C_IR2, FY2C_IR3, FY2C_IR4, FY2C_VIS, slope, aspect, sun shadow, solar elevation, solar elevation sin, horizontal solar orientation, slope solar elevation, slope solar elevation sin, hourly slope solar radiation, pre-accumulative solar radiation energy, accumulative solar radiation energy, sunrise, sunset, day time length, and the label (station # followed by year, month, day and time).

(4) repeating (2) and (3) to obtain row data vector of another unmanned weather station and record data at 00 hour of Aug. 21, 2015.

(5) repeating (2) to (4) to construct AutoVEC, which consisted of a total of 324668 raw data vectors.

(6) this case study has a single temporal point.

(7) normalizing AutoVEC to obtain AutoVEC'.

Step II. establishment of 11 training dataset (supVEC$^1$) and 1st validation dataset (exVEC$^1$), include:

(1) ranking the normalized data vectors of AutoVEC' according to $MT_j$.

(2) the $1^{st}$ leaning dataset, supVEC$^1$, is consisted of data vectors of the first 5 and the last 5.

(3) alternately selecting the data vectors, which is ranked the first 5% and the last 5%, into supVEC$^1$ and 1st validation dataset, exVEC$^1$, i.e., one vector is selected into supVEC$^1$ and the next vector will be selected into exVEC$^1$.

(4) then, randomly select 15% of the rest data vectors into supVEC$^1$, and what left are included in exVEC$^1$.

According to the above steps, there were 30,000 data vectors in supVEC$^1$, and the rest 294,668 data vectors were placed in exVEC$^1$.

Step III. constructing the first sub-model (modelVEC$^1$)

Based on experience, five values of γ were selected as 0.5, 1.0, 1.2, 1.5 and 2. SVM Gaussian kernel function with the data vectors in the $1^{st}$ training dataset (supVEC$^1$) was executed to obtain 5 candidate models. Predicted temperatures ($FT_j$) and prediction errors were calculated using the data entries in exVEC$^1$ and compared with the actually measuring value, $MT_j$. The model with the lowest error was designated as modelVEC$^1$.

Step IV. constructing the second sub-model (modelVEC$^2$), include:

(1) using the data of AutoVEC' and modelVEC$^1$ to calculate the predicted temperatures of AutoVEC' as:

$$AutopixIT_j^1 = \sum_{i=1}^{supNum^1} \alpha_i^1 \times \exp\{-\gamma^1 \times \| modelVEC^1 - AutoVec^i \|^2\} - b^1$$

$$j = 1, 2, ..., L;$$

(2) calculating the absolute errors ($AE_j^1$) between the predicted temperatures (AutopixIT$_j^1$) of the $1^{st}$ sub-model and actual measured temperature $MT_j$, them rank the data vectors of AutoVEC' based on the absolute errors ($AE_j^1$) from high to low;

(3) selecting the first supNum$^2$ data vectors with the highest absolute errors as the $2^{nd}$ training dataset supVEC$^2$, and the rest as the $2^{nd}$ validation set exVEC$^2$; and (4) following Step III to obtain the $2^{nd}$ sub-model modelVEC$^2$; and Step V. constructing the third sub-model (modelVEC$^3$), include:

(1) using the data of AutoVEC' and modelVEC$^2$ to calculate the predicted temperatures of AutoVEC' as:

$$AutopixIT_j^2 = \sum_{i=1}^{supNum^2} \alpha_i^2 \times \exp\{-\gamma^2 \times \| modelVEC^2 - AutoVec^i \|^2\} - b^2$$

$$j = 1, 2, ..., L;$$

(2) calculating the absolute absolute errors ($AE_j^2$) between the predicted temperatures (AutopixIT$_j^2$) and actual measured temperature $MT_j$;

(3) using the smaller value of $AE_j^1$ and $AE_j^2$ as the estimated absolute error of $j^{th}$ sample ($AE_j^3$) of the third sub-model, which is:

$$AE_j^3 = Min(AE_j^1, AE_j^2);$$

(4) ranking the data vectors of AutoVEC' based on the estimated absolute errors ($AE_j^3$) from high to low;

(5) selecting the first supNum data vectors with the highest estimated absolute errors $AE_j^3$ as the $3^{rd}$ training dataset ssupVEC$^3$, and the rest as the $3^{rd}$ validation set exVEC$^3$; and (6) following Step III to construct modelVEC$^3$;

Step VI: establishing raw dataset for the raster pixel of sBlkVEC and its normalization, include:

(1) dividing a targeted area into 37 (BlkNum) small square subset areas (sBlk). Each sBlk is further divided into 1202×1202=sBlkSample pixels;

(2) establishing raw dataset for each pixel of sBlk and record as <GridpixIT$_q^f$, $G_q^1$, $G_q^2$, ..., $G_q^i$, Label>, q=1, 2, ..., sBlkSamples, i=1, 2, ..., N. GridpixIT$_q^f$ is the calculated temperature of $q^{th}$ pixel of $f^{th}$ sub-model. $G_q^i$ is the $i^{th}$ influential variable of the $q^{th}$ pixel. The $G_q^i$ values are based on the weather satellite data, DEM data and calendar roles to construct the raw dataset for the raster pixel of sBlkVEC. Label is default (space only); and (3) normalizing data vectors sBlkVEC, and get standardized sBlkVEC';

Step VII: Ta retrieving of every sub-model, include:

(1) Vector sBlkVEC' is inputted into sub modelVEC$^1$ to modelVEC$^3$, respectively, to calculate the predicted temperature of the $1^{st}$ sub-model (modelVEC$^1$) as GridpixIT$_q^1$ to the $3^{rd}$ sub-model (modelVEC$^3$) of GridpixIT$_q^3$ of each pixel as:

$$GridpixIT_q^f = \sum_{i=1}^{supNum^f} \alpha_i^f \times \exp\{-\gamma^f \times \| modelVEC^f - sBlkVEC^i \|^2\} - b^f$$

Here, $q = 1, 2, ..., sBlkSamples$, $f = 1, 2, 3, ...$sub-models;

(2) the calculated Ta of the $1^{st}$ sub-model GridpixIT$_q^1$ as the retrieving image of that sBlk.

Follow the same scheme to obtain the $2^{nd}$ to the $3^{rd}$ sub-model retrieving image of that sBlk.

(3) selecting another sBlk and repeat above (1) and (2) to complete all sBlk within the 37 BlkNum;

(4) combining all sBlks in the 37 BlkNum of the $1^{st}$ sub-model to form retrieving image of the target area surfT$^1$;

Follow the (1) to step (4) to obtain the $2^{nd}$ and $3^{rd}$ sub-model retrieving image surfT$^2$ and surfT$^3$;

(5) within the targeted area and targeted temporal window select another time point and repeat above (1) to (4) to obtain serials of near surface air temperature images. In this case study, 00 hour of Aug. 21, 2015 was the only one temporal point;

Step VIII. marking abnormal samples in surfT$^f$ and define their near-range regions, include:

(1) in surfT$^1$, read pixlT$_k^1$ which is the calculated temperature at $k^{th}$ unmanned weather station with $1^{th}$ sub-model, where k=1, 2, ... K$_t$. K represents the number of unmanned weather stations with actual Ta measurement (MT$_k$) at target temporal point;

(2) establishing the absolute errors RealAE$_k^1$ as:

$$RealAE_k^1 = |pixlT_k^1 - MT_k|$$

If RealAE$_k^1 \geq \delta$ (a set error threshold), the $k^{th}$ pixel (unmanned weather station) is classified as abnormal. The error threshold is commonly set at $\delta$=2-3° C. In this case study, $\delta$=2.0° C.;

(3) defining the near-range region of the abnormal samples, wherein, the near-range region of the $k^{th}$ abnormal samples is defined as the polygon (at least a triangle) formed by $\sigma$ multiplies the distance between the $k^{th}$ unmanned weather station and the adjacent unmanned weather stations at all directions (at least three directions). The value $\sigma$ is set according to need (normally at 0.75-1.0). If there is no unmanned weather station in one direction, the boundary of the research region should be the boundary of the target area. In this case study, the $\sigma$=0.75.

(4) for a given $\delta$, if raster pixel where the $k^{th}$ weather stations is located in is abnormal, its near-range region is expressed as badPolygon$_{\delta k}^1$; and (5) recorded as:

$$badPolygon_\delta^1 = \bigcup_{k=1}^{K_i} badPolygon_{\delta k}^1;$$

(6) repeating Steps (1) to (5) to establish badPolygon$_\delta^f$ for sub-model 2 to f; and (7) recorded as:

$$mostbadPolygon_\delta = \bigcap_{f=1}^{f} badPolygon_\delta^f;$$

Step IX. selective arithmetic mean method (SAM) for improved surfT, for $\delta=\delta_0$ $(0<\delta_0)$, (1) recording badsurfT$_\delta^f$ as the region of extracting (surfT$^f$) by mask (badPolygon$_\delta^f$)

(2) defining the weights in SAM of pixl$^f$ in surfT$^f$ as surfParameter$_\delta^f$, If pixl$^f \in$badsurfT$_\delta^f$, surfParameter$_\delta^f$=0, If pixl$^f \notin$badsurfT$_\delta^f$, surfParameter$_\delta^f$=1, and If pixl$^f \in$badsurfT$_\delta^f$ is true for all f=1, 2, 3, . . . , i.e. pixl$^f \in$mostbadPolygon$_\delta$, then surfParameter$_\delta^f$=1; and (3) the formula of SAM preliminary Ta retrieving is as:

$$surfT = \frac{\sum_{f=1}^{f}(surfParameter_\delta^f \times surfT^f)}{\sum_{f=1}^{f} surfParameter_\delta^f}$$

Where $f = 1, 2, 3, \ldots$ ;

and

Step X. for the region that pixl$^f \in$badsurfT$_\delta^f$ within surfT$^f$ is true for all f=1, 2, 3, . . . ; a further operation is required, wherein (1) if mostbadPolygon$_\delta$ is empty, the result of Step IX is final and we achieve more accurate surfT;

(2) if mostbadPolygon$_\delta$ is not empty, separate the mostbadPolygon$_\delta$ from the target area. Set $\delta=\delta_1$, repeat Steps VIII and IX until mostbadPolygon$_\delta$ is empty or $\delta=\delta_s$, where multiple $\delta$ values are set as $0<\delta_0<\delta_1<\delta_2<\ldots\delta_i\ldots<\delta_s$. The obtained more accurate surfT of mostbadPolygon$_{\delta i}$ is used to replace what used in Step IX to achieve more accurate surfT.

FIG. 1 is the final near surface air temperature image of 16 hour on Aug. 21, 2015 of Guangxi. The darker area is higher temperature area and the lighter area is lower temperature area.

This case study was accomplished by the following hardware and software:

Hardware: AMAX high performance supercomputer workstation containing 16 CPUs and four GPUs (C2075) each with 448 cores.

Software: Windows 7 operating system; SVM-Light V6.01 for model construction; ArcGIS 9.3, Arc Engine 9.3 and GDAL1.9 for GIS spatial data analysis and GIS data applications; VS2010 C++, VS2005C++/C#, MS Excel 2007, MS Access 2007 and Arrafire 1.9 for input data collection (AutoVEC), data management, and applications of parallel computing.

Case Study 2

Step VIII. identifying abnormal samples in surfT$^f$ and define their near-range regions.

Figure 2:
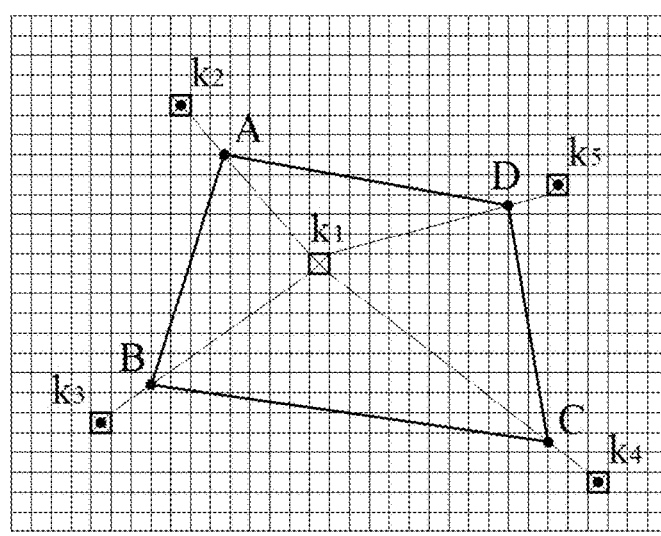
FIG. 2 is a schematic diagram illustrating abnormal samples and their near-range regions of Case Study #1. Each small square represents a pixel and "☒" represents the pixels with unmanned weather station ($k_1$-$k_5$ in this case). Polygon ABCD defines the near-range region of $k_1$.

FIG. 2 illustrates Step VIII—abnormal samples and their near-range regions. Each small square represents a pixel and "⊠" represents the pixels with unmanned weather station (k$_1$-k$_5$ in this case). Polygon ABCD defines the near-range region of k$_1$.

$$\sigma = \frac{d_{k_1 A}}{d_{k_1 k_2}}$$

FIG. 9 illustrates Step VIII and IX.

The black dot represents unmanned weather station locations; the square represents near-range regions while the light square represents unmanned weather station with normal error and its near-range region; the dark square represents unmanned weather station with abnormal error and its near-range region.

FIG. 9(a) shows abnormal error pixels ($\delta=\delta_0=2.0°$ C.) (E3 and A6) and their near-range regions in the full imagery of retrieved near surface air temperature created with the 1$^{st}$ sub-model (Full surfT$^1$). FIG. 9(b) shows abnormal error pixels when $\delta=\delta_0=2.0°$ C. (E3 and C4) and near-range regions in the full imagery of retrieved near surface air temperature created with the 2$^{nd}$ sub-model (Full surfT$^2$). FIG. 9(c) shows abnormal error pixels when $\delta=\delta_0=2.0°$ C. (E3, C4 and A6) and near-range regions in the full imagery of retrieved near surface air temperature created with the 3$^{rd}$ sub-model (Full surfT$^3$).

In FIG. 9(a), the calculation indicates $k_{E3}$ and $k_{A6}$ are abnormal error pixels.

The near-range region of unmanned weather station $k_{E3}$ is recorded as badPolygon$_{\delta k_{E3}}^1$, indicated by dark square E3.

The near-range region of unmanned weather station $k_{A6}$ is recorded as badPolygon$_{\delta k_{A6}}^1$, indicated by dark square A6.

Record badsurfT$_\delta^1$=badPolygon$_\delta^1$=Dark square E3+Dark square A6.

In FIG. 9 (b), the calculation indicates $k_{E3}$ and $k_{C4}$ are abnormal error pixels.

The near-range region of unmanned weather station $k_{E3}$ is recorded as badPolygon$_{\delta k_{E3}}^2$, indicated by dark square E3.

The near-range region of unmanned weather station $k_{A6}$ is recorded as badPolygon$_{\delta k_{C4}}^2$, indicated by dark square C4.

Record badsurfT$_\delta^2$=badPolygon$_\delta^2$=Dark square E3+Dark square C4.

In FIG. 9 (c), the calculation indicates $k_{E3}$, $k_{C4}$ and $k_{A6}$ are abnormal error pixels.

The near-range region of unmanned weather station $k_{E3}$ is recorded as badPolygon$_{\delta k_{E3}}^3$, indicated by dark square E3.

The near-range region of unmanned weather station $k_{C4}$ is recorded as badPolygon$_{\delta k_{C4}}^3$, indicated by dark square E3.

The near-range region of unmanned weather station $k_{A6}$ is recorded as badPolygon$_{\delta k_{C4}}^3$, indicated by dark square A6.

Record badsurfT$_\delta^3$=badPolygon$_\delta^3$=Dark square E3+Dark square C3+Dark square A6.

Mark:

$$mostbadPolygon_\delta = \bigcap_{f=1}^{f} badPolygon_\delta^f = \text{Dark square } E3$$

Step IX. selective arithmetic mean method (SAM) to improve surfT

In surfT$^1$, the dark squares E3 and A6 pixl$^1$ SAM surfParameter$_\delta^1$=0; the rest pixl$^1$ SAM surfParameter$_\delta^1$=1

In surfT$^2$, the dark squares E3 and C4 pixl$^2$ SAM surfParameter$_\delta^2$=0; the rest pixl$^2$ SAM surfParameter$_\delta^2$=1

In surfT$^3$, the dark squares E3, C4 and A6 pixl$^3$ SAM surfParameter$_\delta^3$=0; the rest pixl$^3$ SAM surfParameter$_\delta^3$=1

The SAM of surfT$^1$-surfT$^3$ indicates that the dark square E3 pixl$^f$∈badsurfT$_\delta^f$ is true for all f=1, 2, 3, . . . , i.e. pixl$^f$∈mostbadPolygon$_\delta$, therefore, the SAM of surfT$^1$-surfT$^3$ surfParameter$_\delta^f$=1

The formula of SAM preliminary Ta retrieving is as:

$$surfT = \frac{\sum_{f=1}^{f}(surfParameter_\delta^f \times surfT^f)}{\sum_{f=1}^{f} surfParameter_\delta^f}$$

Where $f = 1, 2, 3, \ldots$ ;

Step X. for the region that pixl$^f$∈badsurfT$_\delta^f$ within surfT$^f$ is true for all f=1, 2, 3, . . . ; a further operation is required.

In this case study, the dark square E3 pixl$^f$∈badsurfT$_\delta^f$ is true for all f=1, 2, 3, . . . , which is $$mostbadPolygon_\delta = \bigcap_{f=1}^{f} badPolygon_\delta^f = \text{Dark square } E3$$

indicating mostbadPolygon$_\delta$ is not empty and E3 requiring further treatment.

Separate the dark square E3 from the target area. Set $\delta=\delta_1=3.0°$ C. to define abnormal error pixels and the near-range region in surfT$^1$, surfT$^2$, surfT$^3$. The results are shown as FIGS. 9 (e), (f) and (g).

Only unmanned weather station $k_{E3}$ has abnormal error in surfT$^1$ (e). No unmanned weather station has abnormal errors in surfT$^2$ and surfT$^3$ (f and g). Therefore, in surfT$^1$, the dark square E3 pixl$^1$ SAM surfParameter$_\delta^1$=0; in surfT$^2$, the dark square E3 pixl$^2$ SAM surfParameter$_\delta^2$=1; and in surfT$^3$, the dark square E3 pixl$^3$ SAM surfParameter$_\delta^3$=1. Once again, following the SAM to calculate near surface air temperature of the dark square E3 replacing what is obtained in Step IX to get more accurate image surfT.

Comparative Analysis Case 1

With the same dataset (16 hour, Aug. 21, 2015), Tables 2-4 illustrate the comparisons between the selective arithmetic mean method (SAM) of the current patent and the arithmetic mean method (AM) of Patent #201510103565. Table 2 shows the results of AM to compare to Tables 3 and 4.

In Table 2, column 2 is the error evaluation of the 1$^{st}$ sub-model for 16 hour Aug. 21, 2015 surfT$^1$. Column 3 is the error evaluation of the 2$^{nd}$ sub-model for 16 hour Aug. 21, 2015 surfT$^2$. Column 4 is the error evaluation of the 3$^{rd}$ sub-model for 16 hour Aug. 21, 2015 surfT$^3$. Column 5 is the error evaluation of the 3$^{rd}$ sub-model for 16 hour Aug. 21, 2015 surfT$^3$ using SAM.

Table 3 and 4 show the error analysis of $\delta_0=2.0/\delta_1=3.0$ and $\delta_0=2.5/\delta_1=3.0$

TABLE 2

Prediction errors of sub-models of the arithmetic mean method*

| Parameters | ModelVEC$^1$ $\gamma = 3.0$ | ModelVEC$^2$ $\gamma = 5.0$ | AM ModelVEC$^3$ $\gamma = 2.0$ | SAM ModelVEC$^3$ $\gamma = 5.0$ | AM Merged Model |
|---|---|---|---|---|---|
| MAE (° C.) | 1.362 | 1.694 | 1.583 | 1.443 | 1.137 |
| RMSEs (° C.) | 1.779 | 2.066 | 1.941 | 1.836 | 1.458 |
| % points with | 54.45 | 65.86 | 63.87 | 54.89 | 47.61 |

TABLE 2-continued

Prediction errors of sub-models of the arithmetic mean method*

| Parameters | ModelVEC$^1$ $\gamma = 3.0$ | ModelVEC$^2$ $\gamma = 5.0$ | AM ModelVEC$^3$ $\gamma = 2.0$ | SAM ModelVEC$^3$ $\gamma = 5.0$ | AM Merged Model |
|---|---|---|---|---|---|
| AE ≥ 1 (° C.) | (740/1359) | (895/1359) | (868/1359) | (746/1359) | (647/1359) |
| % points with | 23.18 | 35.47 | 31.94 | 23.84 | 14.86 |
| AE ≥ 2 (° C.) | (315/1359) | (482/1359) | (434/1359) | (324/1359) | (202/1359) |
| % points with | 9.05 | 14.20 | 10.74 | 9.80 | 4.19 |
| AE ≥ 3 (° C.) | (123/1359) | (193/1359) | (146/1359) | (134/1359) | (57/1359) |

*AE = absolute error; MAE = mean of absolute error; RMSE = Standard deviation of AE; N = 1360 the number of unmanned weather stations having recordings; SAM = Selective Arithmetic Mean Method; AM = Arithmetic Mean Method.
The SAM ModelVEC$^3$($\gamma$ = 5.0) in column 5 is constructed by Step V of Appendix. Here Gauss kernel was used.

TABLE 3

The convergence of the prediction error as merging of the sub-models ($\delta_0 = 2.0$, $\delta_1 = 3.0$)

| Parameters* | ModelVEC$^1$ + ModelVE$^2$ | ModelVEC$^1$ + ModelVE$^2$ + AM ModelVEC$^3$ | ModelVEC$^1$ + ModelVE$^2$ + AM ModelVEC$^3$ + SAM ModelVEC$^3$ | % Improvement** |
|---|---|---|---|---|
| MAE (° C.) | 0.892 | 0.862 | 0.775 | 31.8 |
| RMSEs (° C.) | 1.236 | 1.173 | 1.091 | 25.2 |
| % points with AE ≥ 1 (° C.) | 33.99 (462/1359) | 33.33 (453/1359) | 26.78 (364/1359) | 43.8 |
| % points with AE ≥ 2 (° C.) | 9.20 (125/1359) | 7.34 (100/1359) | 5.15 (70/1359) | 63.3 |
| % points with AE ≥ 3 (° C.) | 2.43 (33/1359) | 1.77 (24/1359) | 1.83 (25/1359) | 56.3 |

*AE = absolute error; MAE = mean of absolute error; RMSE = Standard deviation of AE; N = 1360 the number of unmanned weather stations having recordings
**Computed based on the results of ModelVEC$^1$ + ModelVE$^2$ + AM ModelVEC$^3$ + SAM ModelVEC$^3$ and the results of the arithmetic mean combination in Table 2 (the last column).
Here SAM ModelVEC$^3$ is the column 5 of Table 2.

Base on the results shown in Table 3 and 4, four basic principles of merging sub-models can be summarized:

(1) While tuning every sub-model to ensure higher generalization of the sub-models, the MAE and RMSEs need to be similar between modeling and validation datasets.

(2) The best merged model is obtained when $\delta_0$ approaches to the critical value.

The critical value $\delta_0$ is defined as ~75% of pixels have AE≤$\delta$ for every sub-model. The best merged model is obtained when $\delta_0$ approaches to the critical value. The case studies had $\delta_0$=2.0. As shown in Table 3 and 4, as $\delta_0$ changed from much greater than 2.0 to close to 2.0, the errors were minimized to reasonably the lowest level.

(3) The merge of sub-models with greater differences creates the best improvement (4) The installment of multiple $\delta$ as $0<\delta_0<\delta_1<\delta_2< \ldots \delta_i \ldots <\delta_s$ can rapidly reduce MAE where pixels with AE≥$\delta_0$ of the different sub-models concentrate. A deep gap of AE appears near $\delta_i$. However, the required RAM space for computation will multiply.

TABLE 4

The convergence of the prediction error as merging of the sub-models ($\delta_0 = 2.5$, $\delta_1 = 3.0$)

| Parameters* | ModelVEC$^1$ + ModelVE$^2$ | ModelVEC$^1$ + ModelVE$^2$ + AM ModelVEC$^3$ | ModelVEC$^1$ + ModelVE$^2$ + AM ModelVEC$^3$ + SAM ModelVEC$^3$ |
|---|---|---|---|
| MAE (° C.) | 0.9230 | 0.9317 | 0.8618 |
| RMSEs (° C.) | 1.257 | 1.224 | 1.159 |
| % points with AE ≥ 1 (° C.) | 35.39 (481/1359) | 38.56 (524/1359) | 32.52 (442/1359) |
| % points with AE ≥ 2 (° C.) | 9.79 (133/1359) | 8.83 (120/1359) | 6.84 (93/1359) |
| % points with AE ≥ 3 (° C.) | 2.58 (35/1359) | 1.62 (22/1359) | 1.77 (24/1359) |

*AE = absolute error; MAE = mean of absolute error; RMSE = Standard deviation of AE; N = 1360 the number of unmanned weather stations having recordings
**Computed based on the results of ModelVEC$^1$ + ModelVE$^2$ + AM ModelVEC$^3$ + SAM ModelVEC$^3$ with $\delta_0$ = 2.5 and $\delta_1$ = 3.0 and the results of the arithmetic mean combination in Table 2 (last column).
Here SAM ModelVEC$^3$ is the column 5 of Table 2.

Comparative Analysis Case 2

Table 5 shows the error analysis of three methods: AM (Patent #201510103565.7), SAM (current patent) and selected minimum method (SM) based on the dataset of 324,668 samples.

Using the steps described in Case study #1, near surface air temperature images (surfT) of the 16 hour, Aug. 20 to the 08 hour, Sep. 1, 2015 were obtained for Guangxi and merged by applying the three methods to obtain final temperature images.

Table 5 shows that SM method is too aggrieve sacrificing generalization and cannot ensure accuracy outside the control area. The AM is relatively conservative with less improvement. The SAM described in the current patent not only eliminates samples of unreasonable errors, but also achieves better generalization. This is true for the overall dataset (column 5 of Table 5). The MAE, RMSEs and AE≥1° C. for overall or local are 0.775° C. and 0.732° C., 1.091° C. and 0.8428° C., and 26.78% and 25.08%, respective, very similar to each other, suggesting good stability.

TABLE 5

Comparative analysis of the merged models derived by three different methods*

| Parameters | AM Method | SAM Method | SM Method | % improvement by SAM |
|---|---|---|---|---|
| MAE (° C.) | 1.0403 | 0.762 | 0.295 | 26.75 |
| RMSEs (° C.) | 1.2977 | 0.8428 | 0.4253 | 35.05 |
| % points with AE ≥ 1 (° C.) | (147400/324668) 45.40 | (81419/324668) 25.08 | (8381/324668) 2.51 | 44.75 |
| % points with AE ≥ 2 (° C.) | (34399/324668) 10.90 | (549/324668) 0.169 | (549/324668) 0.169 | 98.45 |
| % points with AE ≥ 3 (° C.) | (6116/324668) 0.1884 | (400/324668) 0.123 | (84/324668) 2.5873E−2 | 34.71 |

*AE = absolute error; MAE = mean of absolute error; RMSE = Standard deviation of AE; SAM = Selective Arithmetic Mean Method; AM = Arithmetic Mean Method;
% Improvement is computed based on the results of the AM and SAM.

Comparative Analysis Case 3

We also found that there are differences between training and retrieving process. Take the near surface air temperature image surfT of the 16 hour, Aug. 21, 2015 of Guangxi as an example, the

TABLE 6

The effect of super-computation algorithms*

| Parameters | ModelVEC$^1$ $\gamma = 3.0$ | ModelVEC$^2$ $\gamma = 5.0$ | ModelVEC$^3$ $\gamma = 2.0$ | ModelVEC$^4$ $\gamma = 5.0$ | Average |
|---|---|---|---|---|---|
| SVM original program with CPU | | | | | |
| MAE (° C.) | 1.294 | 1.303 | 1.236 | 1.443 | 1.1319 |
| % points with AE ≥ 3 (° C.) | (85/1359) 6.2546 | (102/1359) 7.5055 | (67/1359) 4.930 | (130/1359) 9.5659 | 7.064 |
| SVM super-computation algorithm with CPU + GPU | | | | | |
| MAE (° C.) | 1.362 | 1.694 | 1.583 | 1.407 | 1.5115 |
| % points with AE ≥ 3 (° C.) | (123/1359) 9.0508 | (193/1359) 14.2016 | (146/1359) 10.7432 | (134/1359) 9.8602 | 10.934 |

*AE = absolute error; MAE = mean of absolute error; N = 1360 the number of unmanned weather stations having Ta recordings.

TABLE 7

Prediction error analysis of different retrieving algorithms**

| Algorithms | MAE | RMSEs | % points with AE < 1° C. | % points with AE < 2° C. | % points with AE < 3° C. | Comparison reference | Retrieving Condition |
|---|---|---|---|---|---|---|---|
| Current patent | | | | | | | |
| Selective Arithmetic Mean Method Merged Model | 0.762 | 0.843 | 74.9 | 99.8 | 99.9 | Real measurement | Nature conditions, generalization error |
| Qin et al. 2016 | | | | | | | |
| Arithmetic Mean Method Merged Model | 1.040 | 1.298 | 54.6 | 89.1 | 99.8 | Real measurement | Nature conditions, generalization error |
| Li's 0 * | 2.43 | 2.79 | — | — | 96.36 | Satellite products | River basin with clear sky, modeling result, all results are cited from [0]. |
| BecherLi 1; 0 * | 0.2 | 2.89 | — | — | — | | |
| UVM 2; 0 * | 1.6 | 2.91 | — | — | — | | |
| Sobrino 3; 0 * | 0.30 | 2.96 | — | — | — | | |
| Price 4; 0 * | 0.91 | 2.93 | — | — | — | | |
| Prata 5; 0 * | 2.72 | 3.05 | — | — | — | | |

TABLE 7-continued

Prediction error analysis of different retrieving algorithms**

| Algorithms | MAE | RMSEs | % points with AE < 1° C. | % points with AE < 2° C. | % points with AE < 3° C. | Comparison reference | Retrieving Condition |
|---|---|---|---|---|---|---|---|
| Franca 6; 0 * | 2.72 | 3.71 | — | | | | |
| Kerr 7; 0 * | 4.25 | 4.81 | — | | | | |

* 0: Li, et al.[7]; 1: Becker, et al., [21]; 2: Coil, et al., [22]; 3: Sobrino, et al. [23]; 4: Price[24]; 5: Prata[25]; 6: Franca, et al. [26]; 7: Kerr, et al. [27].
**The percentage of data points with AE < 3° C. is traditionally used to judge results of an algorithms [0]. It is normally around 50% for classical algorisms. The resolution of our algorithms is 90 × 90 m where weather station measurement within a pixel can well represent its true temperature. The predicted temperatures were compared with real measurements. The resolution of other algorithms was 1000 × 1000 m or lower (i.e., 10 × 10 km), and model evaluations were based on satellite products which are remote sensing temperatures as well.

error difference is about 0.1925° C. (Table 6). Such difference may be due to algorithm differences. During training, the original algorithm was used, while during area-wide retrieving the improved super algorithm was used. In the current patent, the calculated temperatures of different sub-models were directly compared with unmanned weather station data to calculate errors, thus avoid error difference and also eliminate the step of error correction. Table 7 is the comparison between the current invention and commonly used retrieving algorithms.

Comparative Analysis Case 4

The absolute errors (AE) of the surfT described in comparative analysis case 2 were calculated for 324,668 samples. The statistical analysis results of the AE were shown in Tables 8 and 9 and FIGS. 3-4, 5A-B and 6. Table 8 shows the effect of atmosphere water content on the prediction errors. The first row of Table 8 corresponds to the two small graphs of the first row of FIG. 3. Tables 9-11 were similar to Table 8, and correspond to FIGS. 4, 5A-B and 6, respectively. Table 9 shows the effect of ground vegetation coverage (EVI). Tables 10 and 11 demonstrate the effects of vertical spectrum and spatial spectrum, respectively.

Figure 3:
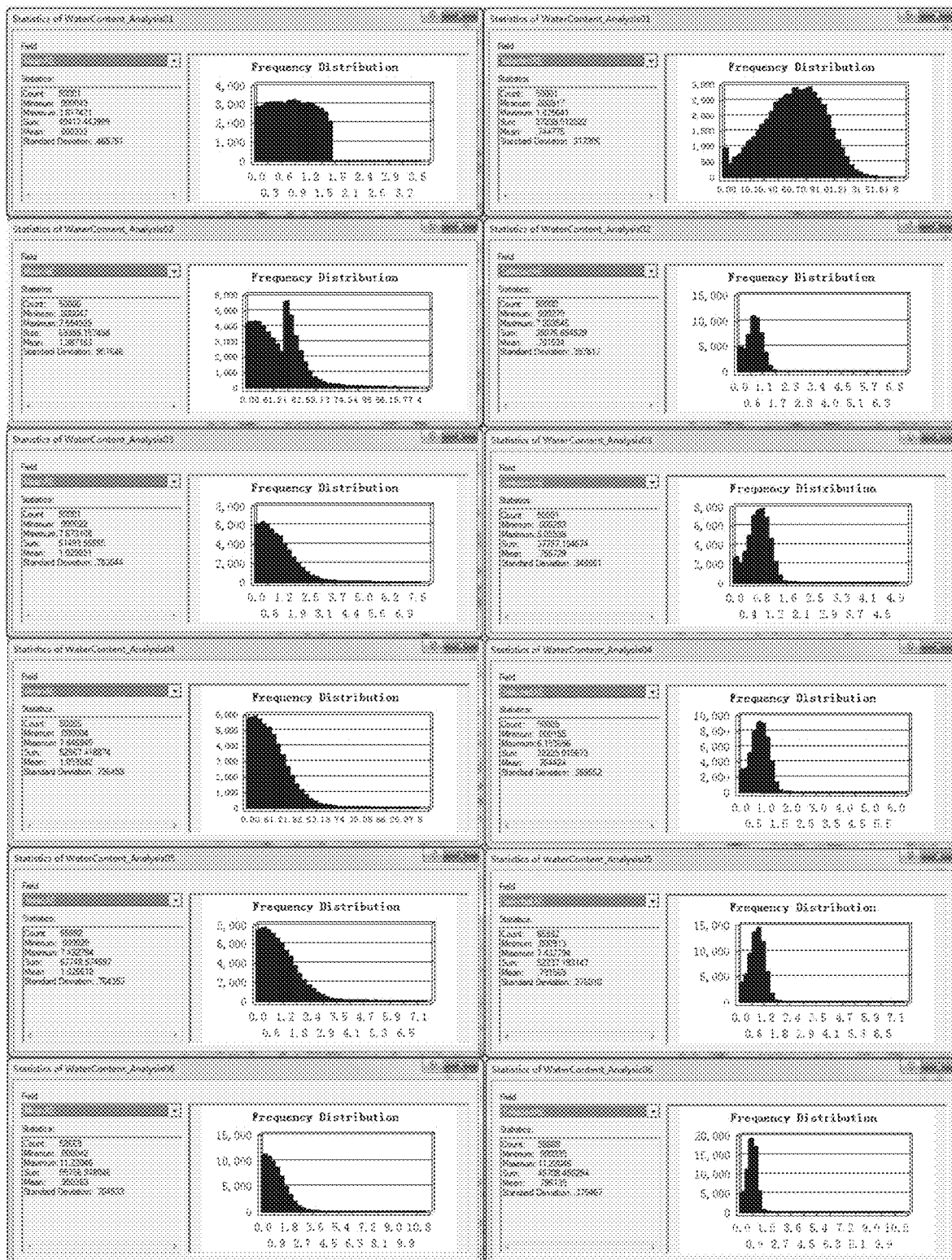
FIG. 3 is a schematic diagram illustrating prediction error analysis under different atmosphere water contents (Case Study #1).
Figure 4:
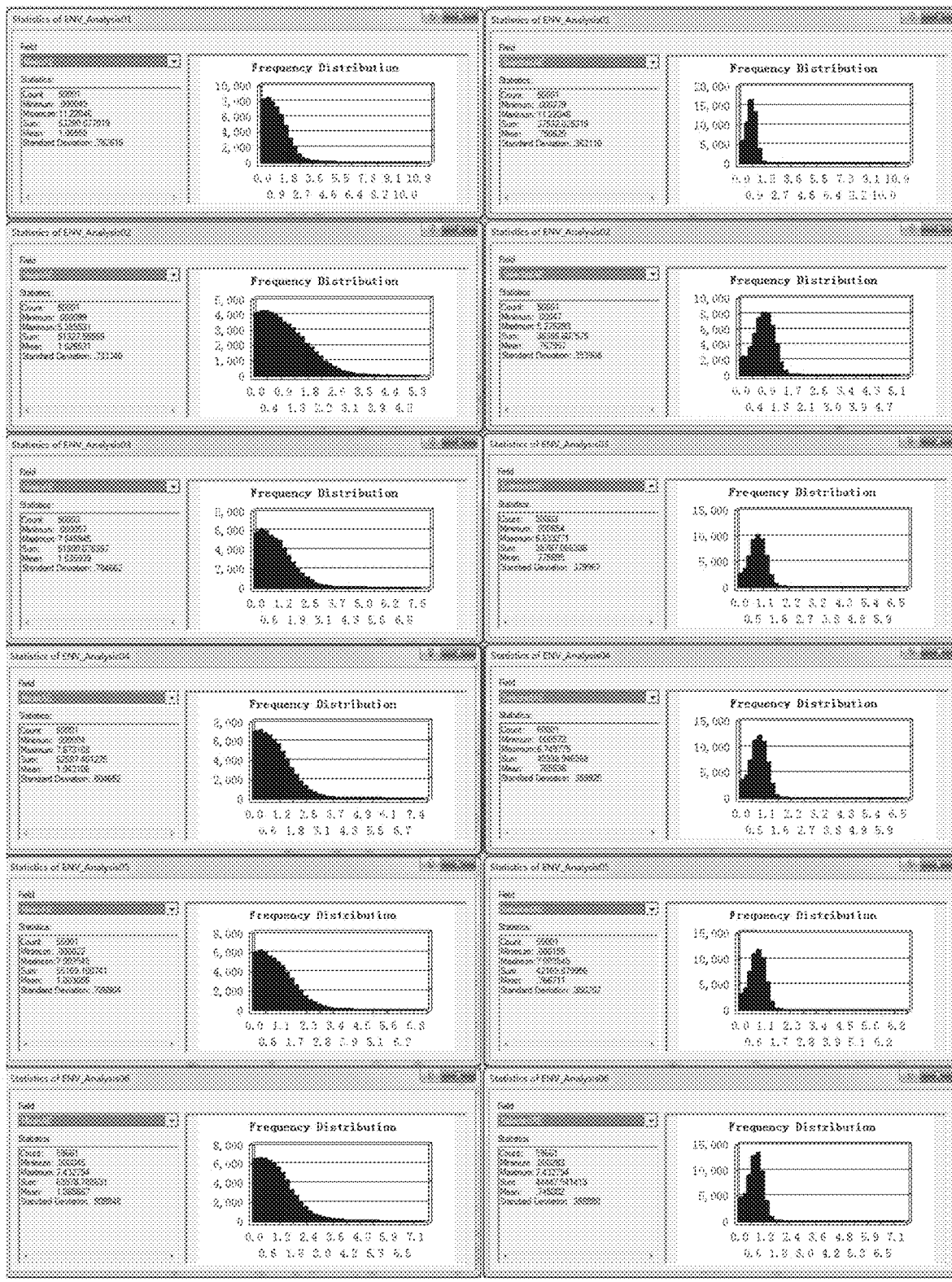
FIG. 4 is a schematic diagram illustrating prediction error analysis under different ground vegetation coverage (Case Study #1).

Tables 8 and 9 and FIGS. 3 and 4 indicate that the errors are independent of atmosphere water content and ground vegetation coverage. The error situation was significantly improved by the different model merging methods. The most apparent characteristic is that a deep gap of AE appears near $\delta_0$. The deep gap appears within the $\delta_0 \pm 0.2$ range. The number of pixels in this range decreases from several thousands to dozens or to zero, which is called $\delta_o$ gap. This phenomenon is the effect of SAM. Secondly, for $AE \geq \delta_0$, the errors decrease significantly. The center of AE distribution moved to the left and stabilized at MAE of 0.75-0.79° C. RMSEs stabilized at 0.60-0.86° C. Another deep gap appears around AE near zero, significantly reduced the number of pixels with AE of zero. It seems that the SAM operation results in larger AE of some pixels around AE near zero, but the operation gains better generalization ability. In addition, AE near to zero is less significant.

TABLE 8

Effect of atmosphere water content on prediction errors of Case study #1

| Atmosphere water content (g cm$^{-2}$) | N | Model* | n $\delta = 2 \pm 0.2$° C. | MAE (° C.) | RMSEs (° C.) | % points with AE < 1° C. | % points with AE < 2° C. | % points with AE < 3° C. |
|---|---|---|---|---|---|---|---|---|
| 1.5 × 10$^{-5}$-4.0 × 10$^{-4}$ | 50001 | SAM | 1 | 0.7448 | 0.8096 | 76.9405 | 100.00 | 100.00 |
| | | AM | 8 | 0.8083 | 0.9329 | 62.5307 | 99.6400 | 99.9920 |
| 4.0 × 10$^{-4}$-0.2134 | 50000 | SAM | 25 | 0.7015 | 0.7875 | 80.4620 | 99.9160 | 99.9340 |
| | | AM | 8386 | 1.3872 | 1.6822 | 60.00 | 76.002 | 95.5080 |
| 0.2134-0.3744 | 50001 | SAM | 30 | 0.7557 | 0.8234 | 75.3730 | 99.8840 | 99.9220 |
| | | AM | 3653 | 1.0299 | 1.2937 | 55.5609 | 89.0882 | 97.9700 |
| 0.3744-0.5505 | 50005 | SAM | 52 | 0.7644 | 0.8491 | 74.3226 | 99.7840 | 99.8420 |
| | | AM | 3761 | 1.0592 | 1.3253 | 53.9926 | 88.1612 | 97.802 |
| 0.5505-0.7781 | 65993 | SAM | 118 | 0.79156 | 0.8731 | 72.0849 | 99.7060 | 99.7848 |
| | | AM | 4847 | 1.0266 | 1.3009 | 55.4938 | 89.1018 | 98.2483 |
| 0.7781-6.399 | 58669 | SAM | 105 | 0.7961 | 0.8802 | 71.7977 | 99.7460 | 99.8176 |
| | | AM | 3809 | 0.95034 | 1.1830 | 58.9976 | 91.7929 | 98.9654 |

*SAM = Selective Arithmetic Mean Method; AM = Arithmetic Mean Method;
Atmosphere water content (g cm$^{-2}$) was calculated using the formula of B. C. Gao and Y. J. Kaufman[28];
"N" is the total number of samples in each water content category.
"n" is the number of pixels with AE of 1.8-2.2° C. ($\delta = 2 \pm 0.2$° C.)

TABLE 9

Effect of ground vegetation coverage (EVI) on prediction errors of Case study #1*

| EVI | N | Model | n $\delta = 2 \pm 0.2$° C. | MAE (° C.) | RMSEs (° C.) | % points with AE < 1° C. | % points with AE < 2° C. | % points with AE < 3° C. |
|---|---|---|---|---|---|---|---|---|
| 0.424-0.248 | 50001 | SAM | 40 | 0.7506 | 0.8334 | 75.1785 | 99.9160 | 99.9340 |
| | | AM | 3951 | 1.0656 | 1.3321 | 53.0929 | 88.5182 | 97.8780 |
| 0.248-0.316 | 50002 | SAM | 51 | 0.7680 | 0.8456 | 74.3825 | 99.8560 | 99.9080 |
| | | AM | 4011 | 1.0265 | 1.2616 | 54.6989 | 89.1802 | 98.6860 |

TABLE 9-continued

Effect of ground vegetation coverage (EVI) on prediction errors of Case study #1*

| EVI | N | Model | n δ = 2 ± 0.2° C. | MAE (° C.) | RMSEs (° C.) | % points with AE < 1° C. | % points with AE < 2° C. | % points with AE < 3° C. |
|---|---|---|---|---|---|---|---|---|
| 0.316-0.361 | 50003 | SAM | 69 | 0.7757 | 0.8638 | 74.1576 | 99.7040 | 99.7600 |
|  |  | AM | 3663 | 1.0359 | 1.2996 | 54.9847 | 89.1746 | 98.0981 |
| 0.361-0.410 | 60001 | SAM | 69 | 0.7656 | 0.8460 | 74.7387 | 99.7833 | 99.8667 |
|  |  | AM | 4585 | 1.0431 | 1.3174 | 54.9191 | 88.9902 | 97.9400 |
| 0.410-0.472 | 55001 | SAM | 53 | 0.7667 | 0.8429 | 74.6296 | 99.8582 | 99.8909 |
|  |  | AM | 3995 | 1.0031 | 1.2388 | 56.0790 | 90.2911 | 98.7273 |
| 0.472-0.674 | 59661 | SAM | 49 | 0.7450 | 0.8269 | 76.2525 | 99.8693 | 99.8994 |
|  |  | AM | 4442 | 1.0657 | 1.3379 | 53.7738 | 88.4531 | 97.4657 |

*EVI index was calculated using clear sky MODIS imagery (Table 1).
EVI = (Channel2 − Channel1)/(Channel2 + Channel1); SAM = Selective Arithmetic Mean Method; AM = Arithmetic Mean Method.

Figure 5A:
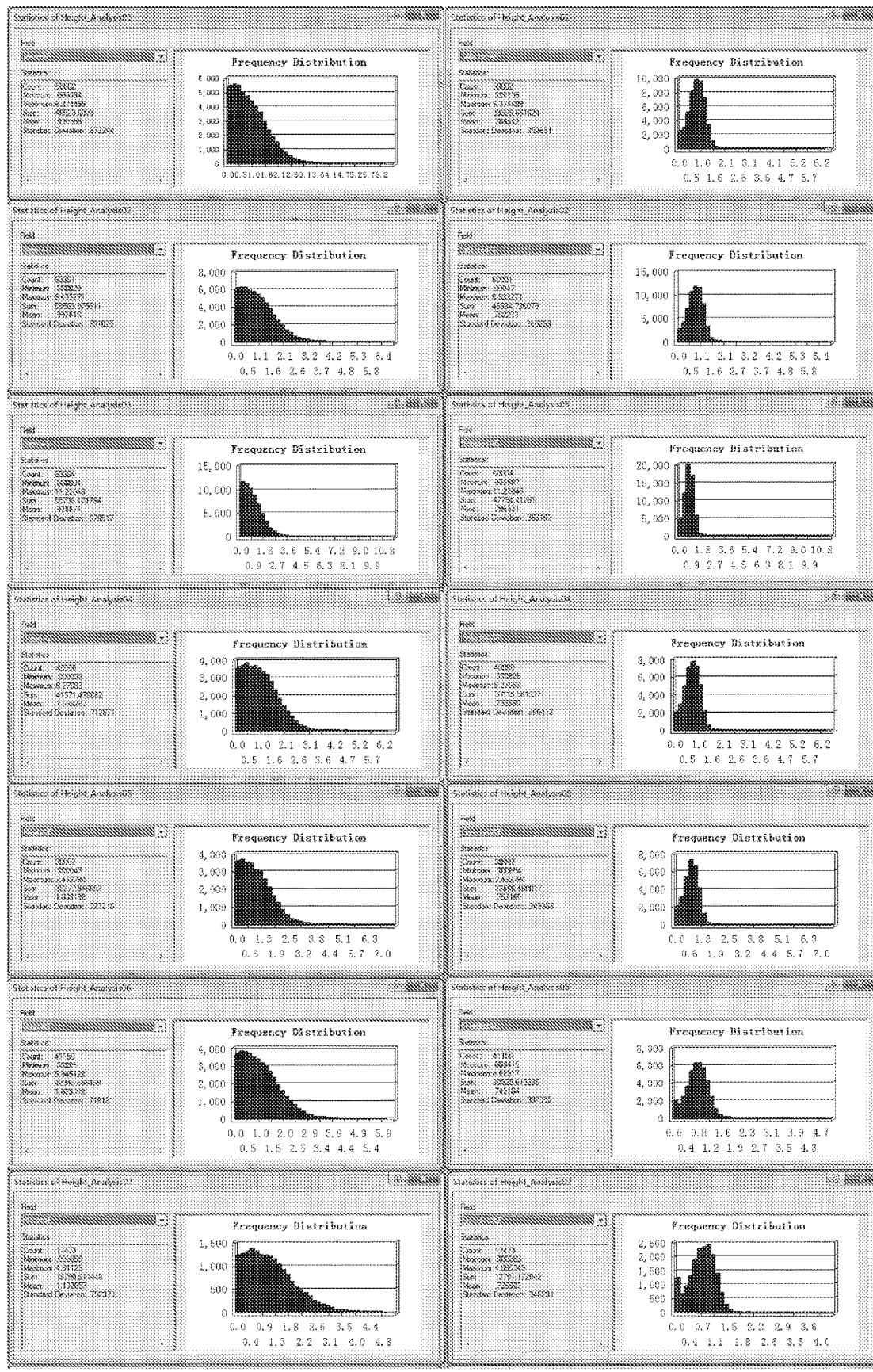
FIG. 5A and FIG. 5B are a schematic diagram illustrating prediction error analysis under different altitudes (Case Study #1).
Figure 5B:
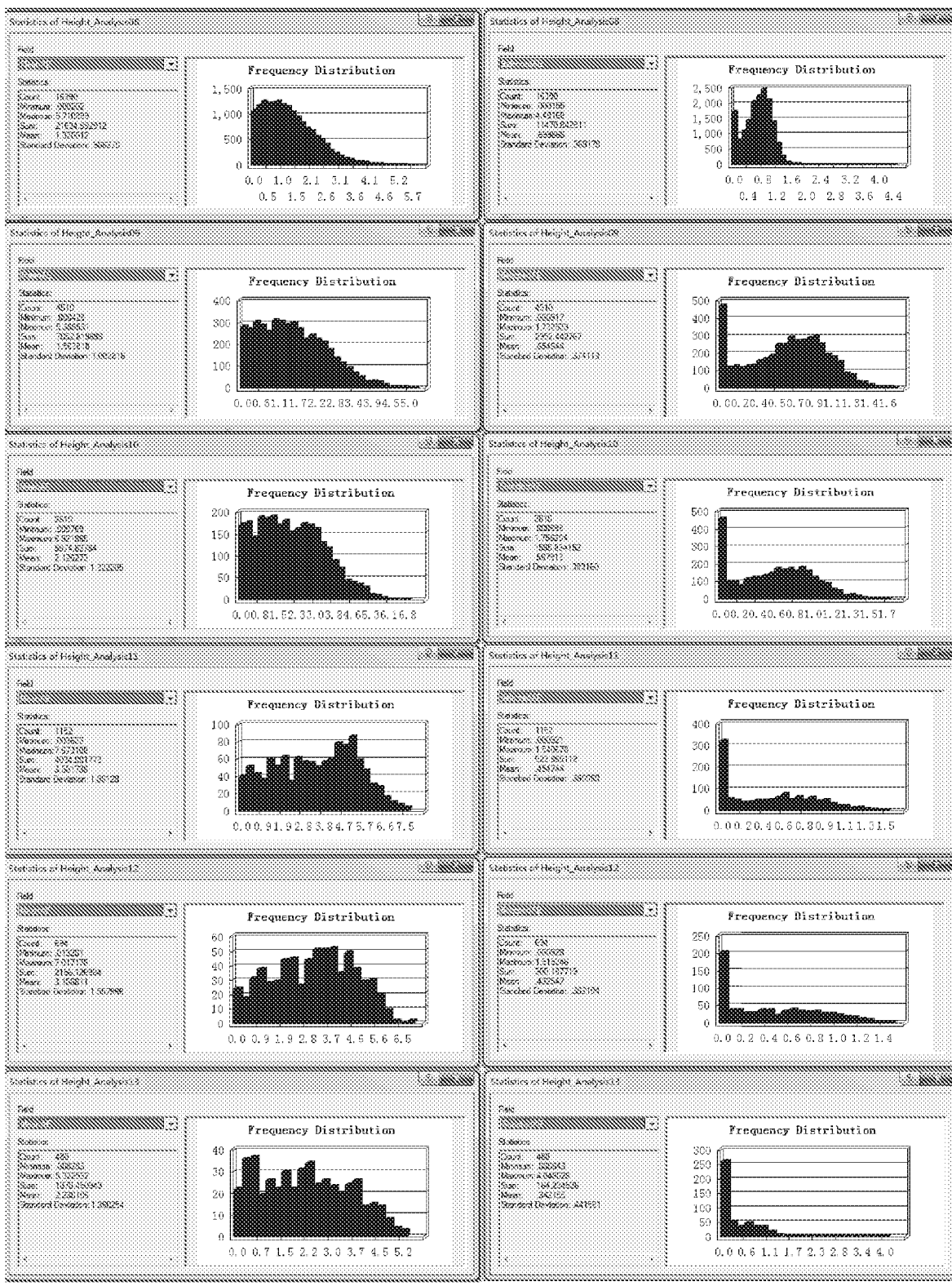
Figure 6:
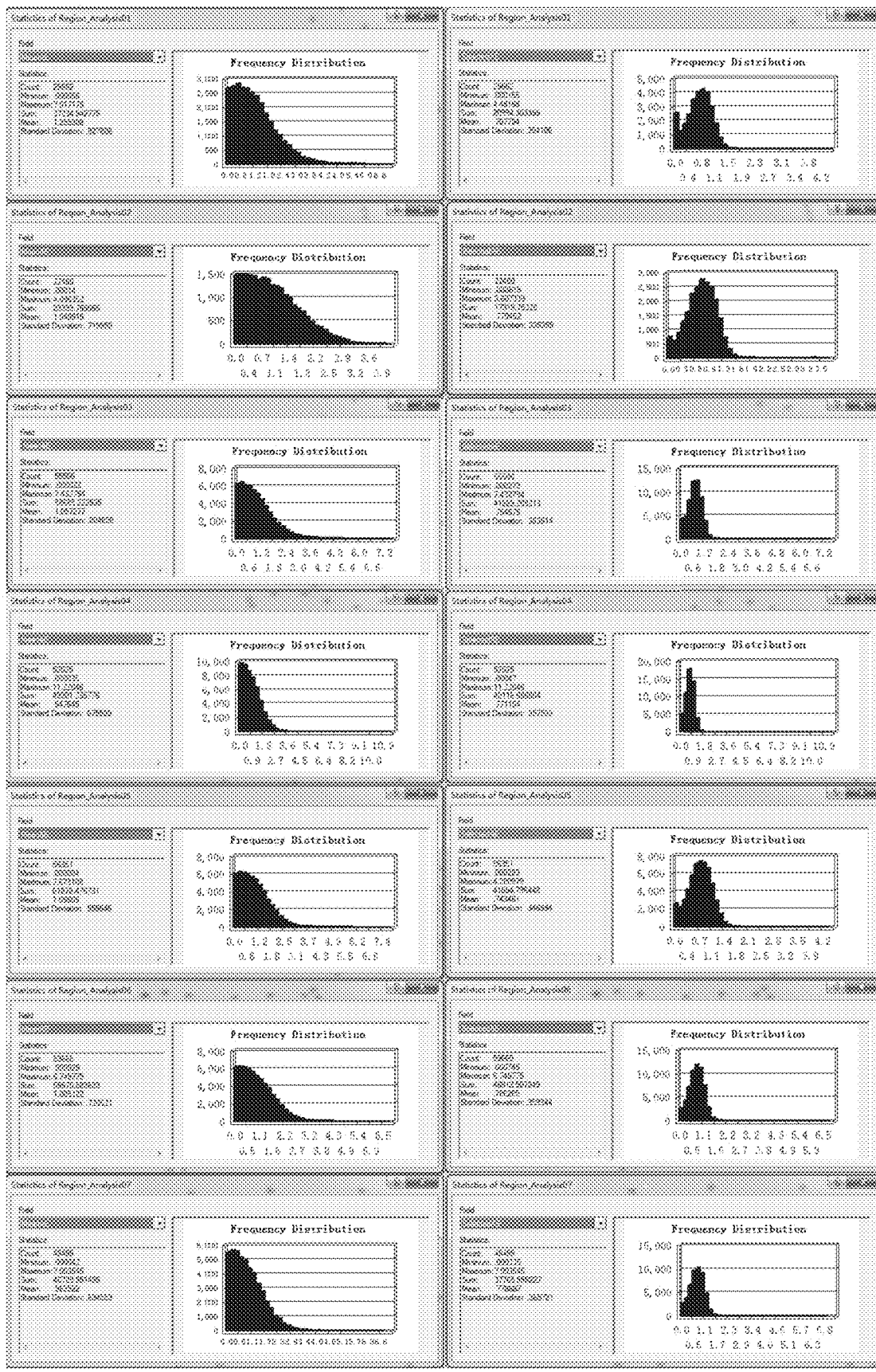
FIG. 6 is a schematic diagram illustrating prediction error analysis under different spatial spectrum (Case Study #1).
Figure 7:
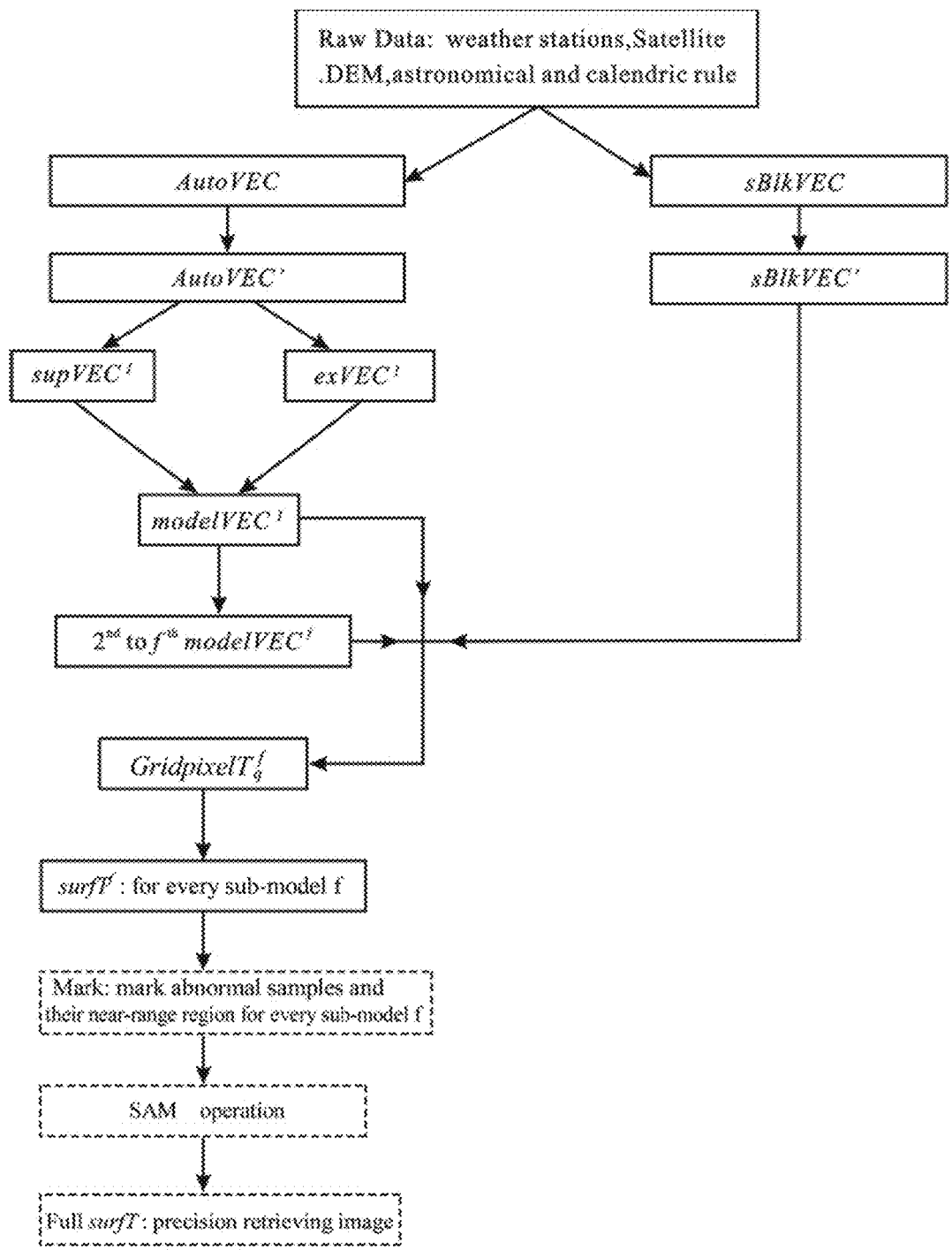
FIG. 7 is a flowchart of the near surface air temperature retrieving process described in this patent.
Figure 8:
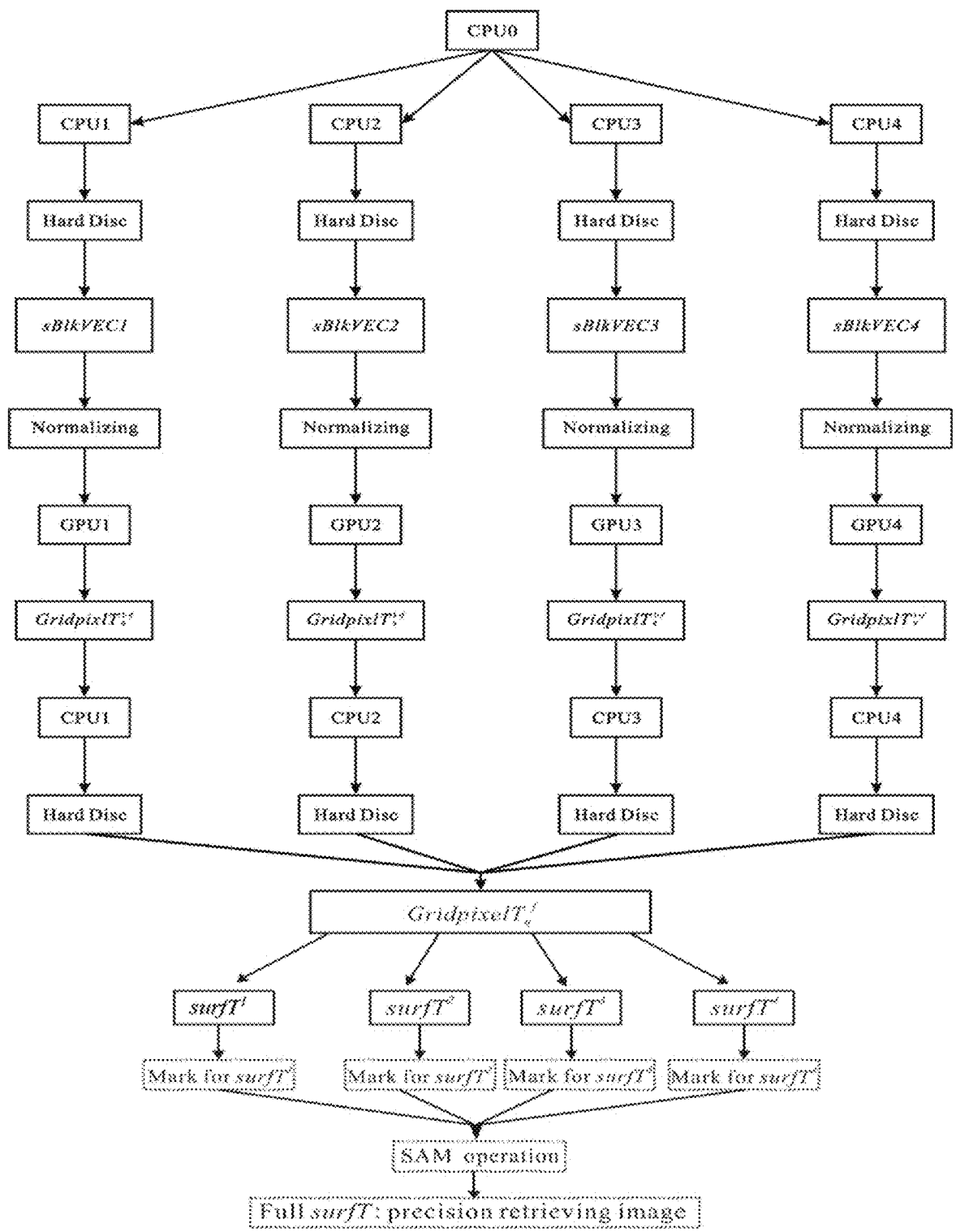
FIG. 8 is a flowchart of the CPU+GPU application in calculation of the near surface air temperature retrieving algorithm. CPU0 initiates multiple CPUs' multiple threads to perform calculation simultaneously, followed by GPU super-core calculation.

Similarly, a deep gap of AE appears near $\delta_1$. Tables 10 and 11, and FIGS. 5A-B and 6 show that the absolute errors of the retrieved temperatures (surfT) in Case study #1 also are not associated with vertical (altitude) or spatial spectra. The right columns of FIGS. 5A-B and 6 show a deep gap of AE at near $\delta_0$. The gap appears within the $\delta_0 \pm 0.2$ range. For $AE \geq \delta_0$, the errors decrease significantly. The center of AE distribution moved to the left and stabilized at MAE of 0.75-0.79° C. RMSEs stabilized at 0.60-0.86° C.

TABLE 10

Effect of vertical spectrum on prediction errors of Case study #1*

| Altitude (m) | N | Model | n δ = 2 ± 0.2° C. | MAE (° C.) | RMSEs (° C.) | % points with AE < 1° C. | % points with AE < 2° C. | % points with AE < 3° C. |
|---|---|---|---|---|---|---|---|---|
| 0-100 | 50002 | SAM | 65 | 0.7865 | 0.8620 | 72.4491 | 99.8580 | 99.8920 |
|  |  | AM | 3255 | 0.9306 | 1.1480 | 59.5096 | 92.5463 | 99.3180 |
| 100-150 | 60001 | SAM | 82 | 0.7822 | 0.8633 | 73.2054 | 99.7200 | 99.7983 |
|  |  | AM | 4480 | 0.9928 | 1.2154 | 55.9024 | 90.9285 | 99.0483 |
| 150-200 | 60004 | SAM | 89 | 0.7965 | 0.8754 | 72.5135 | 99.7450 | 99.8317 |
|  |  | AM | 3966 | 0.9289 | 1.1491 | 59.8060 | 92.5255 | 99.3100 |
| 200-300 | 40000 | SAM | 27 | 0.7529 | 0.8373 | 76.354 | 99.8075 | 99.8300 |
|  |  | AM | 3245 | 1.0393 | 1.2602 | 52.865 | 90.0150 | 99.0550 |
| 300-400 | 30002 | SAM | 32 | 0.7522 | 0.8293 | 76.0716 | 99.8767 | 99.9067 |
|  |  | AM | 2212 | 1.0092 | 1.2416 | 55.1463 | 90.6373 | 98.7834 |
| 400-600 | 41150 | SAM | 24 | 0.7491 | 0.8216 | 76.9818 | 99.9222 | 99.9465 |
|  |  | AM | 3929 | 1.0290 | 1.2549 | 53.7932 | 89.4192 | 98.9769 |
| 600-800 | 17473 | SAM | 5 | 0.7269 | 0.8060 | 77.3651 | 99.9714 | 99.9771 |
|  |  | AM | 1495 | 1.1327 | 1.3823 | 49.7282 | 85.4919 | 97.5677 |
| 800-1000 | 16390 | SAM | 6 | 0.6999 | 0.7913 | 78.1635 | 99.9634 | 99.9817 |
|  |  | AM | 1686 | 1.3200 | 1.6023 | 42.6236 | 78.3099 | 94.9176 |
| 1000-1200 | 4510 | SAM | 0 | 0.6546 | 0.7540 | 81.7517 | 100.00 | 100.00 |
|  |  | AM | 507 | 1.5638 | 1.8577 | 66.5706 | 67.3614 | 91.1752 |
| 1200-1397 | 2810 | SAM | 0 | 0.5679 | 0.6851 | 86.2278 | 100.00 | 100.00 |
|  |  | AM | 267 | 2.1263 | 2.5039 | 23.9502 | 49.8221 | 73.1673 |
| 1397-1575 | 1152 | SAM | 0 | 0.4545 | 0.5991 | 90.7986 | 100.00 | 100.00 |
|  |  | AM | 78 | 3.5017 | 3.9657 | 11.8055 | 26.6493 | 40.2778 |
| 1575-1658 | 694 | SAM | 0 | 0.4326 | 0.5838 | 89.7695 | 100.00 | 100.00 |
|  |  | AM | 51 | 3.1068 | 3.4756 | 11.2392 | 27.4820 | 45.1009 |
| 1658-1965 | 480 | SAM | 1 | 0.3422 | 0.5586 | 94.4583 | 99.7917 | 99.7917 |
|  |  | AM | 46 | 2.2301 | 2.6122 | 23.7500 | 44.5833 | 68.9583 |

*SAM = Selective Arithmetic Mean Method; AM = Arithmetic Mean Method.

TABLE 11

Effect of spatial spectrum on prediction errors of Case study #1*

| Spatial regions | N | Model | n δ = 2 ± 0.2° C. | MAE (° C.) | RMSEs (° C.) | % points with AE < 1° C. | % points with AE < 2° C. | % points with AE < 3° C. |
|---|---|---|---|---|---|---|---|---|
| Region 01 | 29662 | SAM | 5 | 0.7078 | 0.7914 | 78.6461 | 99.9764 | 99.9798 |
|  |  | AM | 1301 | 1.2553 | 1.5609 | 46.1769 | 81.1173 | 95.024 |
| Region 02 | 22480 | SAM | 14 | 0.7705 | 0.8407 | 74.2073 | 99.9288 | 99.9511 |
|  |  | AM | 1874 | 1.0409 | 1.2656 | 53.3496 | 88.8746 | 99.1281 |
| Region 03 | 55506 | SAM | 59 | 0.7547 | 0.8466 | 75.7990 | 99.7550 | 99.7910 |
|  |  | AM | 4041 | 1.0573 | 1.3287 | 54.6067 | 87.9418 | 97.4651 |
| Region 04 | 52026 | SAM | 62 | 0.7711 | 0.8499 | 74.7243 | 99.8482 | 99.8962 |
|  |  | AM | 3382 | 0.94765 | 1.1638 | 58.2401 | 92.2827 | 99.3234 |

TABLE 11-continued

Effect of spatial spectrum on prediction errors of Case study #1*

| Spatial regions | N | Model | n δ = 2 ± 0.2° C. | MAE (° C.) | RMSEs (° C.) | % points with AE < 1° C. | % points with AE < 2° C. | % points with AE < 3° C. |
|---|---|---|---|---|---|---|---|---|
| Region 05 | 56351 | SAM | 42 | 0.7435 | 0.8205 | 76.5931 | 99.8864 | 99.9397 |
|  |  | AM | 4567 | 1.0981 | 1.3939 | 52.3256 | 88.034 | 97.2742 |
| Region 06 | 59665 | SAM | 80 | 0.7863 | 0.8645 | 72.7596 | 99.7771 | 99.8341 |
|  |  | AM | 4633 | 1.0051 | 1.2367 | 55.5468 | 90.4735 | 98.8067 |
| Region 07 | 48499 | SAM | 67 | 0.7787 | 0.8603 | 73.2654 | 99.7608 | 99.8289 |
|  |  | AM | 3277 | 0.9635 | 1.1878 | 57.9517 | 91.5545 | 99.1010 |

*The study area is divided into seven spatial regions based on topographical characteristics.
Region 01, longitude ≤106.5; karst landform areas;
Region 02, longitude >111.0; mountain areas;
Region 03, longitude >106.5 but <108.5 and latitude ≥23.5; karst landform areas;
Region 04, longitude >106.5 but <108.5 and latitude <23.5; sub karst landform and sub mountain areas;
Region 05, longitude ≥108.5 but <111.0 and latitude ≥24.5; high mountain area;
Region 06, longitude ≥108.5 but <111.0 and latitude ≤24.5 but >23.0; medium height mountain area;
Region 07, longitude ≥108.5 but <111.0 and latitude ≤23.0; flat.
'n' is the number of pixels with AE of 1.8-2.2° C. (δ = 2 ± 0.2° C.)

CONCLUSIONS

1. Tables 8-11 and the corresponding FIGS. 3-4, 5A-B and 6 indicate that under different atmosphere water content, EVI index, sea level and spatial spectrum, the selective arithmetic mean method is superior with better error evaluations.
2. The selective arithmetic mean method is better than the simple arithmetic mean method, particularly near $\delta_0$, within $\delta_0 \pm 0.2$.
3. The selective arithmetic mean method has better stability. Under different atmosphere water content, EVI index, sea level and spatial spectrum, the MAE is 0.75-0.79° C. RMSEs stabilize at 0.60-0.86° C. Local and overall results also are similar.
4. This near surface air temperature retrieving method is applicable over a large area because first it is suitable for all cloud conditions (clear sky, cloudy or overcast); second the computation is accomplished on a super-computing platform, which enables area-wide applications.

REFERENCE

[1] T. R. Blandford et al., Seasonal and synoptic variations in near-surface air temperature lapse rates in a mountainous basin. *J. Appl. Meteor Climatol.*, Vol. 47, No. 1, pp. 249-261, January 2008.
[2] C. Vancutsem, P. Ceccato, T. Dinku, and S. J. Connor, Evaluation of MODIS land surface temperature data to estimate air temperature in different ecosystems over Africa. *Remote Sens. Environ.*, Vol. 114, No. 2, pp. 449-465, February 2010.
[3] A. A. Hassaballa, and A. B. Matori, The use and evaluation of split-window techniques for NOAA/AVHRR surface temperature extraction over different surface covers: case study (Perak Tengah & Manjong) area, Malaysia. *IJCEE-IJENS*, Vol. 11, No. 5, pp: 22-27, October 2011.
[4] J. L. Qin, Preliminary inquiry on technical support system for the precision-farming with Chinese characteristics. *Transaction of the Chinese Society of Agricultural Engineering*, Vol. 17, No. 3, pp. 1-6, March 2001 (in Chinese with English Abstract).
[5] G X. Zhao, H. Q. Wang, An algorithm to determine land surface temperature and emissivity with Satellite telemetry. *Science Bulletin*. Vol 42(18) 1957~1960, 1997. (in Chinese with English abstract)
[6] Z. Y. Lou, H. H. Liu, W. N. Yang, The application study of mono window algorithm in Chengdu for land temperature retrieval. *Journal of Tropical Meteorology*. 23(4), 409-412, 2007 (in Chinese with English abstract).
[7] T. H. Li, X. K. Mo, P. Han, Land surface temperature basin by combination of calculation in Yellow River split window algorithms. *J. Test Meas. Technol.*, 22(4), 338-345, 2008. (in Chinese with English Abstract).
[8] H. Yang., Z. D. Yang, A modified land surface temperature split window retrieval algorithm and its applications over China. *Journal of Remote Sensing*, 10(4). 600-607, 2006. (in Chinese with English abstract).
[9] C. L. Wang, L. S. Tang, S. S. Chen, Z. Z. Huang. J. He. All-weather applicable methodology to retrieve land surface temperature for cold disaster monitoring. *Chinese Journal of Agrometeorology*, 28(1). 80-87, 2007. (in Chinese with English abstract).
[10] S. H. Chen, Q. W. Zhang, C. Wang, J. Z. Zhou, MODIS and SPOT images fusion based on the intensity correlation moment. *Journal of Remote Sensing*. 10(1), 90-96, 2007. (in Chinese with English abstract).
[11] J. Dong, N. B. Wang, X. H. Yang, H. H. Liu. Retrieval Of Land Surface Temperature: Theory, Deduction And Application, *Journal of Gansu Sciences*, 3(4), 36-40, 2001. (in Chinese with English abstract)
[12] H. Li, Y. N. Zeng. P. D. Yun, J. B. Huang, K. Yang, J. Zou. Study on retrieval urban land surface temperature with multi-source remote sensing data. *Journal of Remote Sensing*, 11(6), 891-898, 2007. (in Chinese with English abstract)
[13] H. Li, Y. N. Zeng, P. D. Yun, et al. Applying multi-angle thermography to extract temperature in the canopy constituent and temperature in the orientation. *Journal of Beijing Normal University (Natural Science)*. 2007, O6, Vol. 43(3): 891~898, 2007. (in Chinese with English abstract)
[14] Q. H. Liu, X. R. Xu, J. Y. Cheng. The retrieval of land surface temperature and emissivity by remote sensing data: Theory and digital simulation. *J. Remote Sens.* 2(1), 1-9, 1998. (in Chinese with English abstract).
[15] W B. Min, X. L. Luo, Z. M. Chen, C. C. Shi, Y Q. Cao. An experiment on LSF conceptual model to retrieve grass canopy leaf temperature. *Journal of Remote Sensing*, 10(6), 941-948, 2006. (in Chinese with English abstract)

[16] Y S. Zhang, X. Guo, X. M Zhang, M. Y. Li, M. Y., Study on the inversion method of land surface temperature by applying IR bright temperature data of still satellite. *Northwestern Seismological Journal.* 26(2), 113-117, 2004. (in Chinese with English abstract)
[17] G. X. Zhao, H. Q. Wang, An algorithm to determine Land surface temperature and emissivity with Satellite telemetry. *Science Bulletin*. Vol. 42(18) 1957~1960, 1997. (in Chinese with English abstract)
[18] Kearns M, Li M, Valiant L. (1994) *J. ACM* 41 1298.
[19] Krogh A. Vdelsby J. Neural network ensembles, cross validation and active learning in: Tesauro G. Touretzky D. Leen Teds. *Advances in Neural Information Processing Systems* 7. Cambridge, Mass.: MIT Press, 1996.231-238
[20] Jiang-Lin Qin, Xiu-Hao Yang, He Fu, and Xiu-Feng Lei. A Novel Nonlinear Algorithm for Area-wide Near Surface Air Temperature Retrieval. *IEEE J. Sel. Top. Appl. Earth Obs. Remote Sens.* VOL. 9, NO. 7, pp 3283-3296, July 2016.
[21] F. Becker and Z. L. Li, "Towards a local split window method over land surface," *Int. J. Remote Sens.*, vol. 11, no. 3, pp. 369-393, March 1990.
[22] C. Coil, V. Caselles, and A. Sobrino. "On the atmospheric dependence of the split-window equation for land surface temperature." *Int. J. Remote Sens.*, vol. 15, no. 1, pp. 105-122. January 1994.
[23] J. A. Sobrino, C. Coll, and V. Caselles, "Atmospheric correction for land surface temperature using NOAA-11 AVHRR channels 4 and 5," *Remote Sens. Environ.*, vol. 38, no. 1, pp. 19-34, October 1991.
[24] J. C. Price, "Land surface temperature measurements from the split window channels of the NOAA 7 advanced very high resolution radiometer," *J. Geophys. Res.*, vol. 89, no. D5, pp. 7231-7237, August 1984.
[25] A. J. Prata, "Land surface temperature derived from the advanced very high resolution radiometer and the along-track scanning radiometer theory," *J. Geophys. Res.*, vol. 98, no. D9, pp. 16689-16702, September 1993.
[26] G B. Franca and A. P. Cracknell, "Retrieval of land and sea surface temperature using NOAA 11 AVHRR data in north-eastern Brazil," *Int. J. Remote Sens.*, vol. 15, no. 1. pp. 1695-1712, January 1994.
[27] Y. H. Kerr, J. P. Lagouarde, and J. Imbernon, "Accurate land surface temperature retrieval from AVHRR data with use of an improved splitwindow algorithm," *Remote Sens. Environ.*, vol. 41, nos. 2-3. pp. 197-209, March 1992.
[28] B. C. Gao and Y. J. Kaufman, "Water vapor retrievals using Moderate Resolution Imaging Spectroradiometer (MODIS) near-infrared channels," J. Geophys. Res., vol. 108, no. D13, p. 4389. July 2003, doi:10.1029/2002 JD 003023.

What is claimed is:

1. A novel nonlinear method for area-wide near surface air temperature precision retrieval, comprising the following steps:

Step I: establishing raw datasets and normalizing—AutoVEC';

Step II: establishing the $1^{st}$ training dataset (supVEC$^1$) and the $1^{st}$ validation dataset (exVEC$^1$);

Step III: obtaining the $1^{st}$ sub-model (modelVEC$^1$);

Step IV: obtaining the $2^{nd}$ sub-model (modelVEC$^2$);

Step V: obtaining the $3^{rd}$ sub-model (modelVEC$^3$) to the $f^{th}$ sub-model (modelVEC$^f$), including:

1) using the normalized datasets of AutoVEC' and the $(f-1)^{th}$ sub-model modelVEC$^{f-1}$ to calculate the predicted temperatures of AutoVEC' as:

$$AutopixlT_j^{f-1} = \sum_{i=1}^{supNum^{f-1}} \alpha_i^{f-1} \times \exp\{-\gamma^{f-1} \times \|modelVEC^{f-1} - AutoVEC'\|^{f-1}\} - b^{f-1},$$

where $j = 1, 2, \ldots, L; f \geq 3, \text{ and } f \in Z^+;$ 2) calculating the absolute errors ($AE_j^{f-1}$) between the predicted temperatures of the $(f-1)^{th}$ sub-model (AutopixlT$_j^{f-1}$) and actual measured temperature (MT$_j$);

3) calculating the estimated absolute error ($AE_j^f$) of the predicted temperature of $f^{th}$ sub-model at $j^{th}$ sample point, so that, $AE_j^f = \text{Min}(AE_j^1, \ldots, AE_j^{f-2}, AE_j^{f-1});$ 4) ranking the data vectors of AutoVEC' based on the estimated absolute error value ($AE_j^f$) from high to low;

5) selecting supNum$^f$ data vectors with the higher estimated absolute errors ($AE_j^f$) as the $f^{th}$ sub-model training dataset supVEC$^f$, and the rest as the $f^{th}$ validation set exVEC$^f$; and 6) following Step III to obtain modelVEC$^f$;

Step VI: establishing raw dataset for the raster pixel of sBlkVEC and normalized setsBlkVEC';

Step VII: near surface air temperature (Ta) retrieving of sub-models, including:

1) inputting vector sBlkVEC' to sub modelVEC$^1$ through modelVEC$^f$, respectively, to calculate the predicted temperature of the $1^{st}$ sub-model as GridpixlT$_q^1$ to the $f^{th}$ sub-model of GridpixlT$_q^f$ of each pixel as:

$$GridpixlT_q^f = \sum_{i=1}^{supNum^f} \alpha_i^f \times \exp\{-\gamma^f \times \|modelVEC^f - sBlkVEC'\|^2\} - b^f,$$

here, $q = 1, 2, \ldots, sBlkSamples, f = 1, 2, 3, \ldots$ sub-models;

2) calculating Ta of the $1^{st}$ sub-model GridpixlT$_q^1$ is the retrieving image of that sBlk, and following the same scheme to obtain the $2^{nd}$ to the $f^{th}$ sub-model retrieving image of that sBlk;

3) selecting another sBlk and repeat above 1) and 2) to complete all sBlk within all BlkNum; and 4) combining all BlkNum sBlks of the $1^{st}$ sub-model to form retrieving image of the target area surfT$^1$, and following the same steps to obtain the $2^{nd}$ to $f^{th}$ sub-model retrieving image surfT$^2$ to surfT$^f$;

Step VIII: marking abnormal samples and their near-range regions in surfT$^f$, including:

1) in surfT$^1$, reading pixlT$_k^1$ which is the calculated temperature at k$^{th}$ unmanned weather station with $1^{th}$ sub-model, where k=1, 2, . . . K$_t$. K represents number of the unmanned weather stations with actual Ta measurement (MT$_k$) at target temporal point;

2) establishing RealAE$_k^1$,

RealAE$_k^1$ = |pixlT$_k^1$ − MT$_k$|, wherein if RealAE$_k^1 \geq \delta$ (a set error threshold), the k$^{th}$ pixel is classified as abnormal;

3) defining the near-range region of the abnormal samples, wherein the near-range region of the $k^{th}$ abnormal samples is defined as the polygon (at least a triangle) formed by σ multiplies the distance between the $k^{th}$ unmanned weather station and the adjacent unmanned weather stations at all directions (at least three directions), the value σ is set according to need (normally at 0.75~1.0), if there is no unmanned weather station in one direction, the boundary of the research region should be the boundary of the target area;

4) for a given δ, if raster pixel where the $k^{th}$ weather stations is located in is abnormal, its near-range region is expressed as $badPolygon_{\delta k}^1$;

5) recording $$badPolygon_\delta^1 = \bigcup_{k=1}^{K_t} badPolygon_{\delta k}^1;$$

6) repeating Steps 1) to 5) to establish $badPolygon_\delta^f$; and
7) recording $$mostbadPolygon_\delta = \bigcap_{f=1}^{f} badPolygon_\delta^f;$$

Step IX: selective arithmetic mean method (SAM) to obtain accurate surfT,
for threshold $\delta=\delta_0$ ($0<\delta_0$),
1) recording $badsurfT_\delta^f$ as the region of extracting ($surfT^f$) by mask ($badPolygon_\delta^f$);
2) defining the weights in SAM of $pixl^f$ in $surfT^f$ as $surfParameter_\delta^f$,
if $pixl^f \in badsurfT_\delta^f$, $surfParameter_\delta^f=0$,
if $pixl^f \notin badsurfT_\delta^f$, $surfParameter_\delta^f=1$, and
if $pixl^f \in badsurfT_\delta^f$ is true for all f=1, 2, 3, . . . , i.e. $pixl^f \in mostbadPolygon_\delta$, then $surfParameter_\delta^f=1$; and
3) the preliminary formula of SAM Ta retrieving is as:

$$surfT = \frac{\sum_{f=1}^{f}(surfParameter_\delta^f \times surfT^f)}{\sum_{f=1}^{f} surfParameter_\delta^f}, \text{ where } f = 1, 2, 3, \ldots;$$

and
Step X: for the region that $pixl^f \in badsurfT_\delta^f$ within $surfT^f$ is true for all f=1, 2, 3, . . . ; a further operation is required, wherein
1) if $mostbadPolygon_\delta$ is empty, the result of Step IX is final and we achieve more accurate surfT,
2) if $mostbadPolygon_\delta$ is not empty, separate the $mostbadPolygon_\delta$ from the target area, set $\delta=\delta_1$, repeat Steps VIII and IX until $mostbadPolygon_\delta$ is empty or $\delta=\delta_s$, where multiple δ values are set as $0<\delta_0<\delta_1<\delta_2 < \ldots \delta_i \ldots <\delta_s$, and the obtained more accurate surfT of $mostbadPolygon_{\delta i}$ is used to replace what used in Step IX to achieve more accurate surfT, and
forming and outputting an area-wide near surface air temperature retrieving image to enable real-time near surface temperature retrieval for meteorological data processing base on the surfT.

2. The novel nonlinear method for area-wide near surface air temperature precision retrieval of claim 1, wherein, the abnormal sample threshold δ=2-3° C., and near-range region multiplier σ=0.75-1.0.

3. The novel nonlinear method for area-wide near surface air temperature precision retrieval of claim 1, wherein,
Step I: establishing raw datasets and normalizing AutoVEC' as following:
1) setting a target area and locates all unmanned weather stations in that area;
2) setting a target temporal point (a date and a time point) and set a collection window of 2-72 hours around the set target time point, the actual time of measurement taking by the weather stations within this window is entered as the collecting time;
3) the raw data were recorded in the format: <$MT_j$, $F^1_j$, $F^2_j$, . . . $F^i_j$, Label>, j=1, 2, . . . , L; 1=1, 2, . . . , N; $MT_j$ represents the actual Ta measurement of $j^{th}$ raw data record, $F^1_j$ represents the measurement of $i^{th}$ influential variable at the $j^{th}$ raw data record; N is the number of predetermined variables; L is the number of raw data records, finally, Label records the numerical identifier of that weather station and the actual observation date and time point, only complete data vectors were included,
wherein each data vector $F^i_j$ consists of air temperature measurement of that weather station ($MT_j$) at a set time point and the corresponding (temporal and spatial) measurement of $i^{th}$ variable from satellites, DEM, and astronomical and calendric rules;
4) selecting another weather station or different time point of the same station and repeat 3) to get all data vector;
5) recording raw data vectors which obtained from step 2) and 3) as AutoVEC;
6) for the same target area, selecting another time point, repeat 2)-4), and record in AutoVEC;
7) standardizing the raw values of each variable $F^i_j$ which is the influential factor of near surface air temperature in the raw data records AutoVEC to get AutoVEC', the raw data records are obtained from the location of the weather stations;
Step II: constructing the $1^{st}$ training dataset ($supVEC^1$) and the $1^{st}$ validation dataset ($exVEC^1$) as the following:
(1) ranking the data vectors within AutoVEC' according to $MT_j$, the $1^{st}$ leaning dataset, $supVEC^1$, consists of data vectors of the first c and the last d vectors in the ranking;
(2) standardizing vectors ranked the first 3-5% and the last 3-5% are assigned as $supVEC^1$ and $1^{st}$ validation dataset, $exVEC^1$, respectively;
(3) randomly selecting 10-12% of the rest data vectors into $supVEC^1$, and the rests are included in $exVEC^1$;
Step III: constructing the $1^{st}$ sub-model ($modelVEC^1$) as the followings:
applying support vector machine (SVM) Gaussian kernel function with the values (γ) of e parameters set based on experience to the data vectors in the $1^{st}$ training dataset ($supVEC^1$) to obtain e candidate models, and calculating the predicted temperatures ($FT_j$) of these candidate models and the prediction errors using the data entries in $exVEC^1$ and compared with the actual measured value, $MT_j$, wherein the model with the lowest error is designated as $modelVEC^1$;

Step IV: constructing the 2$^{nd}$ sub-model (modelVEC$^2$), including:
1) using the standardized dataset AutoVEC', and the first sub-model, modelVEC$^1$ to calculate the predicted temperatures (AutopixlT$_j^1$) of AutoVEC' as:

$$AutopixlT_j^1 = \sum_{i=1}^{supNum^1} \alpha_i^1 \times \exp\{-\gamma^1 \times \|modelVEC^1 - AutoVEC'\|^2\} - b^1$$

$$j = 1, 2, \ldots, L;$$

2) calculating the absolute errors (AE$_j^1$) between the predicted temperatures (AutopixlT$_j^1$) of the 1$^{st}$ sub-model and actual measured temperature MT$_j$, them rank the data vectors of AutoVEC' based on the absolute errors (AE$_j^1$) from high to low;
3) selecting the first supNum$^2$ data vectors with the highest absolute errors as the 2$^{nd}$ training dataset supVEC$^2$, and the rest as the 2$^{nd}$ validation set exVEC$^2$; and
4) repeating Step III to construct the 2$^{nd}$ sub-model modelVEC$^2$; and Step VI: establishing raw dataset for the raster pixel of sBlkVEC and normalized setsBlkVEC' as the following:
for a given time point within the time window for data collection time window of the targeted time point,
1) dividing a targeted area into BlkNum square subset areas (sBlk), each sBlk is further divided into M×M=sBlkSamples pixels, M represents the number of rows and columns within a sBlk;
2) for every pixel of sBlk, constructing raw data vector sBlkVEC in the format of <GridpixlT$_q^f$, G$_q^1$, G$_q^2$, ... G$_q^i$, Label>, q=1, 2, ..., sBlkSamples, i=1, 2, ..., N; GridpixlT$_q^f$ is the calculated Ta of the q-th pixel of modelVEC$^{fi}$; G$_q^i$ is the i-th influential variables, the values of G$_q^i$ are based on weather satellites, DEM, and astronomical and calendric rules. Label can be a default (space only); and
3) normalizing data vectors sBlkVEC, and get standardized sBlkVEC'.

4. The novel nonlinear method for area-wide near surface air temperature precision retrieval of claim 1, wherein,
1) the Ta influential variables of MODIS include:
  1C, 2C, 7C, 3C and 4C represent vegetation chlorophyll absorption, cloud/canopy boundary, ground/cloud properties and soil/canopy difference, green vegetation, respectively, at the unmanned weather station or pixel locations;
  2C and 19C represent cloud/canopy boundary and cloud/atmosphere properties, respectively, at the unmanned weather station or pixel locations;
  27C and 28C represent cirrus clouds/water vapor at the unmanned weather station or pixel locations; and
  22C, 23C, and 31C represent cloud/ground temperature, and 32C represent cloud height/ground temperature at the unmanned weather station or pixel locations;
2) the Ta influential variables of FY2 satellite include:
  FY2C IR1, FY2C IR2, FY2C IR3 and FY2C IR4 represent brightness temperature; and FY2C_VIS represents reflectivity;
3) the Ta influential variables of DEM include geolocation coordinates, altitude, slope steepness, aspect, sun shadow, solar elevation, solar elevation sin, horizontal solar orientation, slope solar elevation, slope solar elevation sin, hourly slope solar radiation (per unit area), and pre-accumulative solar radiation energy; and
4) the Ta influential variables of calendar rules include accumulative solar radiation energy (per unit area per day), sunrise, sunset, and day time length.

5. The novel nonlinear method for area-wide near surface air temperature precision retrieval of claim 1, wherein, it has the characteristic of treating driving variables and influential variables separately under the concept of ideal conditions, the driving variable is the driver of near surface air temperature, during the day, it is the ground radiation energy per unit area assuming atmosphere absence, during night time, it represents the dynamics of ground radiation energy, the influential variables refer to resent remote sensing data of ground cover conditions under clear sky and the effects of topographical shadows, specifically, atmospheric corridor water vapor content is considered as well, the contributions of these variable's to near surface air temperature are optimized by nonlinear algorithms, and these influential variables can limit the change of near surface air temperature.

6. The novel nonlinear method for area-wide near surface air temperature precision retrieval of claim 1, wherein, the normalization of raw data is performed as:
for the i$^{th}$ influential variable in AutoVEC, obtaining the maximum [F(i)$_{max}$] and minimum [F(I)$_{min}$] values, and using the following formula to calculate the standardized values of each data vectors of AutoVEC (F$_j^i$) to arrive AutoVEC', $$X_j^i = \frac{F_j^i - F(i)_{min}}{F(i)_{max} - F(i)_{min}} \text{ where } X_j^i \text{ are components of } AutoVEC'.$$

7. The novel nonlinear method for area-wide near surface air temperature precision retrieval of claim 1, wherein, parameters c and d mentioned in 1) of Step II are c=3-20 and d=3-20.

8. The novel nonlinear method for area-wide near surface air temperature precision retrieval of claim 1, wherein, the number of sub-models e in Step III is e=3-10.

9. The novel nonlinear method for area-wide near surface air temperature precision retrieval of claim 1, wherein, the f-th sub-model modelVEC$^f$ contains the following parameters: number of support vector supNum$^f$, $\alpha_i^f$, $\gamma^f$ and b$^f$, where f=1, 2, 3, . . . .

10. The novel nonlinear method for area-wide near surface air temperature precision retrieval of claim 1, wherein, Step V is accomplished on a super-computer platform, the CPU+GPU (Graphics Processing Unit) architecture uses multiple CPU threads to construct raw data records of gridded pixels (sBlkVEC) and sBlkVEC normalization, to manage data exchange between RAMs and hard drives, and between RAMs of CPU and GPU, the amount of data for each exchange depends on the RAM size of GPU, and GPU is responsible for calculating the Ta of each pixel based on the 1$^{st}$ sub-model GridpixlT$_q^1$ to the f-th sub-model GridpixlT$_q^f$.

11. One or more non-transitory computer-readable media having stored thereon computer executable instructions that, when executed by at least one processor, cause the at least one processor to generate controls for retrieving area-wide near surface air temperature, by executing the steps comprising:

Step I: establishing raw datasets and normalizing—AutoVEC';
Step II: establishing the $1^{st}$ training dataset (supVEC$^1$) and the $1^{st}$ validation dataset (exVEC$^1$);
Step III: obtaining the $1^{st}$ sub-model (modelVEC$^1$);
Step IV: obtaining the $2^{nd}$ sub-model (modelVEC$^2$);
Step V: obtaining the $3^{rd}$ sub-model (modelVEC$^3$) to the $f^{th}$ sub-model (modelVEC$^f$), including:
1) using the normalized datasets of AutoVEC' and the $(f-1)^{th}$ sub-model modelVEC$^{f-1}$ to calculate the predicted temperatures of AutoVEC' as:

$$AutopixlT_j^{f-1} = \sum_{i=1}^{supNum^{f-1}} \alpha_i^{f-1} \times \exp\{-\gamma^{f-1} \times \|modelVEC^{f-1} - AutoVEC'\|^{f-1}\} - b^{f-1},$$

where $j = 1, 2, \ldots, L$; $f \geq 3$, and $f \in Z^+$;

2) calculating the absolute errors ($AE_j^{f-1}$) between the predicted temperatures of the $(f-1)^{th}$ sub-model (AutopixlT$_j^{f-1}$) and actual measured temperature (MT$_j$);
3) calculating the estimated absolute error ($AE_j^f$) of the predicted temperature of $f^{th}$ sub-model at $j^{th}$ sample point, so that, $$AE_j^f = \text{Min}(AE_j^1, \ldots, AE_j^{f-2}, AE_j^{f-1});$$

4) ranking the data vectors of AutoVEC' based on the estimated absolute error value ($AE_j^f$) from high to low;
5) selecting supNum$^f$ data vectors with the higher estimated absolute errors ($AE_j^f$) as the $f^{th}$ sub-model training dataset supVEC$^f$, and the rest as the $f^{th}$ validation set exVEC$^f$; and
6) following Step III to obtain modelVEC$^f$;
Step VI: establishing raw dataset for the raster pixel of sBlkVEC and normalized setsBlkVEC';
Step VII: near surface air temperature (Ta) retrieving of sub-models, including:
1) inputting vector sBlkVEC' to sub modelVEC$^1$ through modelVEC$^f$, respectively, to calculate the predicted temperature of the $1^{st}$ sub-model as GridpixlT$_q^1$ to the $f^{th}$ sub-model of GridpixlT$_q^f$ of each pixel as:

$$GridpixlT_q^f = \sum_{i=1}^{supNum^f} a_i^f \times exp\{-\gamma^f \times \|modelVEC^f - sBlkVEC'\|^2\} - b^f,$$

here, $q = 1, 2, \ldots, sBlkSamples$, $f = 1, 2, 3, \ldots$ sub-models;

2) calculating Ta of the $1^{st}$ sub-model GridpixlT$_q^1$ is the retrieving image of that sBlk, and following the same scheme to obtain the $2^{nd}$ to the $f^{th}$ sub-model retrieving image of that sBlk;
3) selecting another sBlk and repeat above 1) and 2) to complete all sBlk within all BlkNum; and
4) combining all BlkNum sBlks of the $1^{st}$ sub-model to form retrieving image of the target area surfT$^1$, and following the same steps to obtain the $2^{nd}$ to $f^{th}$ sub-model retrieving image surfT$^2$ to surfT$^f$;
Step VIII: marking abnormal samples and their near-range regions in surfT$^f$, including:
1) in surfT$^1$, reading pixlT$_k^1$ which is the calculated temperature at $k^{th}$ unmanned weather station with $1^{st}$ sub-model, where k=1, 2, … K$_t$. K represents number of the unmanned weather stations with actual Ta measurement (MT$_k$) at target temporal point;
2) establishing RealAE$_k^1$, $$RealAE_k^1 = |pixlT_k^1 - MT_k|,$$

wherein if RealAE$_k^1 \geq \delta$ (a set error threshold), the $k^{th}$ pixel is classified as abnormal;
3) defining the near-range region of the abnormal samples,
wherein the near-range region of the $k^{th}$ abnormal samples is defined as the polygon (at least a triangle) formed by a multiplies the distance between the $k^{th}$ unmanned weather station and the adjacent unmanned weather stations at all directions (at least three directions), the value σ is set according to need (normally at 0.75~1.0), if there is no unmanned weather station in one direction, the boundary of the research region should be the boundary of the target area;
4) for a given δ, if raster pixel where the $k^{th}$ weather stations is located in is abnormal, its near-range region is expressed as badPolygon$_{\delta k}^1$;
5) recording $$badPolygon_\delta^1 = \bigcup_{k=1}^{K_t} badPolygon_{\delta k}^1;$$

6) repeating Steps 1) to 5) to establish badPolygon$_\delta^f$; and
7) recording $$mostbadPolygon_\delta = \bigcup_{f=1}^{f} badPolygon_\delta^f;$$

Step IX: selective arithmetic mean method (SAM) to obtain accurate surfT,
for threshold $\delta = \delta_0$ ($0 < \delta_0$),
1) recording badsurfT$_\delta^f$ as the region of extracting (surfT$^f$) by mask (badPolygon$_\delta^f$);
2) defining the weights in SAM of pixl$^f$ in surfT$^f$ as surfParameter$_\delta^f$,
if pixl$^f \in$ badsurfT$_\delta^f$, surfParameter$_\delta^f = 0$,
if pixl$^f \notin$ badsurfT$_\delta^f$, surfParameter$_\delta^f = 1$, and
if pixl$^f \in$ badsurfT$_\delta^f$ is true for all f=1, 2, 3, …, i.e. pixl$^f \in$ mostbadPolygon$_\delta$, then surfParameter$_\delta^f$ of =1; and
3) the preliminary formula of SAM Ta retrieving is as:

$$surfT = \frac{\sum_{f=1}^{f}(surfParameter_\delta^f \times surfT^f)}{\sum_{f=1}^{f} surfParameter_\delta^f}, \text{ where } f = 1, 2, 3, \ldots;$$

and
Step X: for the region that pixl$^f \in$ badsurfT$_\delta^f$ within surfT$^f$ is true for all f=1, 2, 3, …; a further operation is required, wherein
1) if mostbadPolygon$_\delta$ is empty, the result of Step IX is final and we achieve more accurate surfT,
2) if mostbadPolygon$_\delta$ is not empty, separate the mostbadPolygon$_\delta$ from the target area, set $\delta = \delta_1$, repeat Steps VIII and IX until mostbadPolygon$_\delta$ is empty or $\delta=\delta_s$, where multiple $\delta$ values are set as $0<\delta_0<\delta_1<\delta_2<\ldots<\delta_i\ldots<\delta_s$, and the obtained more accurate surfT of mostbadPolygon$_{\delta i}$, is used to replace what used in Step IX to achieve more accurate surfT, forming and outputting an area-wide near surface air temperature retrieving image to enable real-time near surface temperature retrieval for meteorological data processing base on the surfT.

12. The non-transitory computer-readable media of claim 11, wherein, the abnormal sample threshold $\delta=2$-$3°$ C., and near-range region multiplier $\sigma=0.75$-$1.0$.

13. The non-transitory computer-readable media of claim 11, wherein,

Step I: establishing raw datasets and normalizing—AutoVEC' as following:
1) setting a target area and locates all unmanned weather stations in that area;
2) setting a target temporal point (a date and a time point) and set a collection window of 2-72 hours around the set target time point, the actual time of measurement taking by the weather stations within this window is entered as the collecting time;
3) the raw data were recorded in the format: <MT$_j$, F$^1_j$, F$^2_j$, ... F$^i_j$, Label>, j=1, 2, ..., L; i=1, 2, ..., N; MT$_j$ represents the actual Ta measurement of j$^{th}$ raw data record, F$^1_j$ represents the measurement of i$^{th}$ influential variable at the j$^{th}$ raw data record; N is the number of predetermined variables; L is the number of raw data records, finally, Label records the numerical identifier of that weather station and the actual observation date and time point, only complete data vectors were included, wherein each data vector F$^i_j$ consists of air temperature measurement of that weather station (MT$_j$) at a set time point and the corresponding (temporal and spatial) measurement of i$^{th}$ variable from satellites, DEM, and astronomical and calendric rules;
4) selecting another weather station or different time point of the same station and repeat 3) to get all data vector;
5) recording raw data vectors which obtained from step 2) and 3) as AutoVEC;
6) for the same target area, selecting another time point, repeat 2)-4), and record in AutoVEC;
7) standardizing the raw values of each variable F$^i_j$ which is the influential factor of near surface air temperature in the raw data records AutoVEC to get AutoVEC', the raw data records are obtained from the location of the weather stations;

Step II: constructing the 1$^{st}$ training dataset (supVEC$^1$) and the 1$^{st}$ validation dataset (exVEC$^1$) as the following:
(1) ranking the data vectors within AutoVEC' according to MT$_j$, the 1$^{st}$ leaning dataset, supVEC$^1$, consists of data vectors of the first c and the last d vectors in the ranking;
(2) standardizing vectors ranked the first 3-5% and the last 3-5% are assigned as supVEC$^1$ and 1$^{st}$ validation dataset, exVEC$^1$, respectively;
(3) randomly selecting 10-12% of the rest data vectors into supVEC$^1$, and the rests are included in exVEC$^1$;

Step III: constructing the 1$^{st}$ sub-model (modelVEC$^1$) as the followings:
applying support vector machine (SVM) Gaussian kernel function with the values ($\gamma$) of e parameters set based on experience to the data vectors in the 1$^{st}$ training dataset (supVEC$^1$) to obtain e candidate models, and calculating the predicted temperatures (FT$_j$) of these candidate models and the prediction errors using the data entries in exVEC$^1$ and compared with the actual measured value, MT$_j$, wherein the model with the lowest error is designated as modelVEC$^1$;

Step IV: constructing the 2$^{nd}$ sub-model (modelVEC$^2$), including:
1) using the standardized dataset AutoVEC', and the first sub-model, modelVEC$^1$ to calculate the predicted temperatures (AutopixlT$^1_j$) of AutoVEC' as:

$$AutopixlT^1_j = \sum_{i=1}^{supNum^1} \alpha^1_i \times \exp\{-\gamma^1 \times \|modelVEC^i - AutoVEC^i\|^2\} - b^1,$$

$j = 1, 2, \ldots, L;$ 2) calculating the absolute errors (AE$^1_j$) between the predicted temperatures (AutopixlT$^1_j$) of the 1$^{st}$ sub-model and actual measured temperature MT$_j$, them rank the data vectors of AutoVEC' based on the absolute errors (AE$^1_j$) from high to low;
3) selecting the first supNum$^2$ data vectors with the highest absolute errors as the 2$^{nd}$ training dataset supVEC$^2$, and the rest as the 2$^{nd}$ validation set exVEC$^2$; and
4) repeating Step III to construct the 2$^{nd}$ sub-model modelVEC$^2$; and Step VI: establishing raw dataset for the raster pixel of sBlkVEC and normalized setsBlkVEC' as the following:

for a given time point within the time window for data collection time window of the targeted time point,
1) dividing a targeted area into BlkNum square subset areas (sBlk), each sBlk is further divided into M×M=sBlkSamples pixels, M represents the number of rows and columns within a sBlk;
2) for every pixel of sBlk, constructing raw data vectors BlkVEC in the format of <GridpixlT$^f_q$, G$^1_q$, G$^2_q$, ... G$^i_q$, Label>, q=1, 2, ..., sBlkSamples, i=1, 2, ..., N; GridpixlT$^f_q$ is the calculated Ta of the q-th pixel of modelVEC$^i$; G$^i_q$ is the i-th influential variables, the values of G$^i_q$ are based on weather satellites, DEM, and astronomical and calendric rules. Label can be a default (space only); and
3) normalizing data vectors sBlkVEC, and get standardized sBlkVEC'.

14. The non-transitory computer-readable media of claim 11, wherein,
1) the Ta influential variables of MODIS include:
1C, 2C, 7C, 3C and 4C represent vegetation chlorophyll absorption, cloud/canopy boundary, ground/cloud properties and soil/canopy difference, green vegetation, respectively, at the unmanned weather station or pixel locations;
2C and 19C represent cloud/canopy boundary and cloud/atmosphere properties, respectively, at the unmanned weather station or pixel locations;
27C and 28C represent cirrus clouds/water vapor at the unmanned weather station or pixel locations; and
22C, 23C, and 31C represent cloud/ground temperature, and 32C represent cloud height/ground temperature at the unmanned weather station or pixel locations;

2) the Ta influential variables of FY2 satellite include: FY2C_IR1, FY2C_IR2, FY2C_IR3 and FY2C_IR4 represent brightness temperature; and FY2C_VIS represents reflectivity;
3) the Ta influential variables of DEM include geolocation coordinates, altitude, slope steepness, aspect, sun shadow, solar elevation, solar elevation sin, horizontal solar orientation, slope solar elevation, slope solar elevation sin, hourly slope solar radiation (per unit area), and pre-accumulative solar radiation energy; and
4) the Ta influential variables of calendar rules include accumulative solar radiation energy (per unit area per day), sunrise, sunset, and day time length.

15. The non-transitory computer-readable media of claim 11, wherein, it has the characteristic of treating driving variables and influential variables separately under the concept of ideal conditions, the driving variable is the driver of near surface air temperature, during the day, it is the ground radiation energy per unit area assuming atmosphere absence, during night time, it represents the dynamics of ground radiation energy, the influential variables refer to resent remote sensing data of ground cover conditions under clear sky and the effects of topographical shadows, specifically, atmospheric corridor water vapor content is considered as well, the contributions of these variable's to near surface air temperature are optimized by nonlinear algorithms, and these influential variables can limit the change of near surface air temperature.

16. The non-transitory computer-readable media of claim 11, wherein, the normalization of raw data is performed as: for the $i^{th}$ influential variable in AutoVEC, obtaining the maximum $[F(i)_{max}]$ and minimum $[F(i)_{min}]$ values, and using the following formula to calculate the standardized values of each data vectors of AutoVEC ($F^i_j$) to arrive AutoVEC', $$X^i_j = \frac{F^i_j - F(i)_{min}}{F(i)_{max} - F(i)_{min}} \text{ where } X^i_j \text{ are components of } AutoVEC'.$$

17. The non-transitory computer-readable media of claim 11, wherein, parameters c and d mentioned in 1) of Step II are c=3-20 and d=3-20.

18. The non-transitory computer-readable media of claim 11, wherein, the number of sub-models e in Step III is e=3-10.

19. The non-transitory computer-readable media of claim 11, wherein, the f-th sub-model modelVEC$^f$ contains the following parameters: number of support vector supNum$^f$, $\alpha^f_i$, $\gamma^f$ and $b^f$, where f=1, 2, 3, . . . .

20. The non-transitory computer-readable media of claim 11, wherein, Step V is accomplished on a super-computer platform, the CPU+GPU (Graphics Processing Unit) architecture uses multiple CPU threads to construct raw data records of gridded pixels (sBlkVEC) and sBlkVEC normalization, to manage data exchange between RAMs and hard drives, and between RAMs of CPU and GPU, the amount of data for each exchange depends on the RAM size of GPU, and GPU is responsible for calculating the Ta of each pixel based on the $1^{st}$ sub-model GridpixlT$^1_q$ to the f-th sub-model GridpixlT$^f_q$.

* * * * *